Jan. 23, 1934.                    U. I. T. BLOMBERG                    1,944,165
                                  DUPLICATING MACHINE
                                  Filed July 30, 1928            9 Sheets-Sheet 1

Inventor:
Ulrik I. T. Blomberg
By Wilkinson, Huxley, Byron & Knight Attys

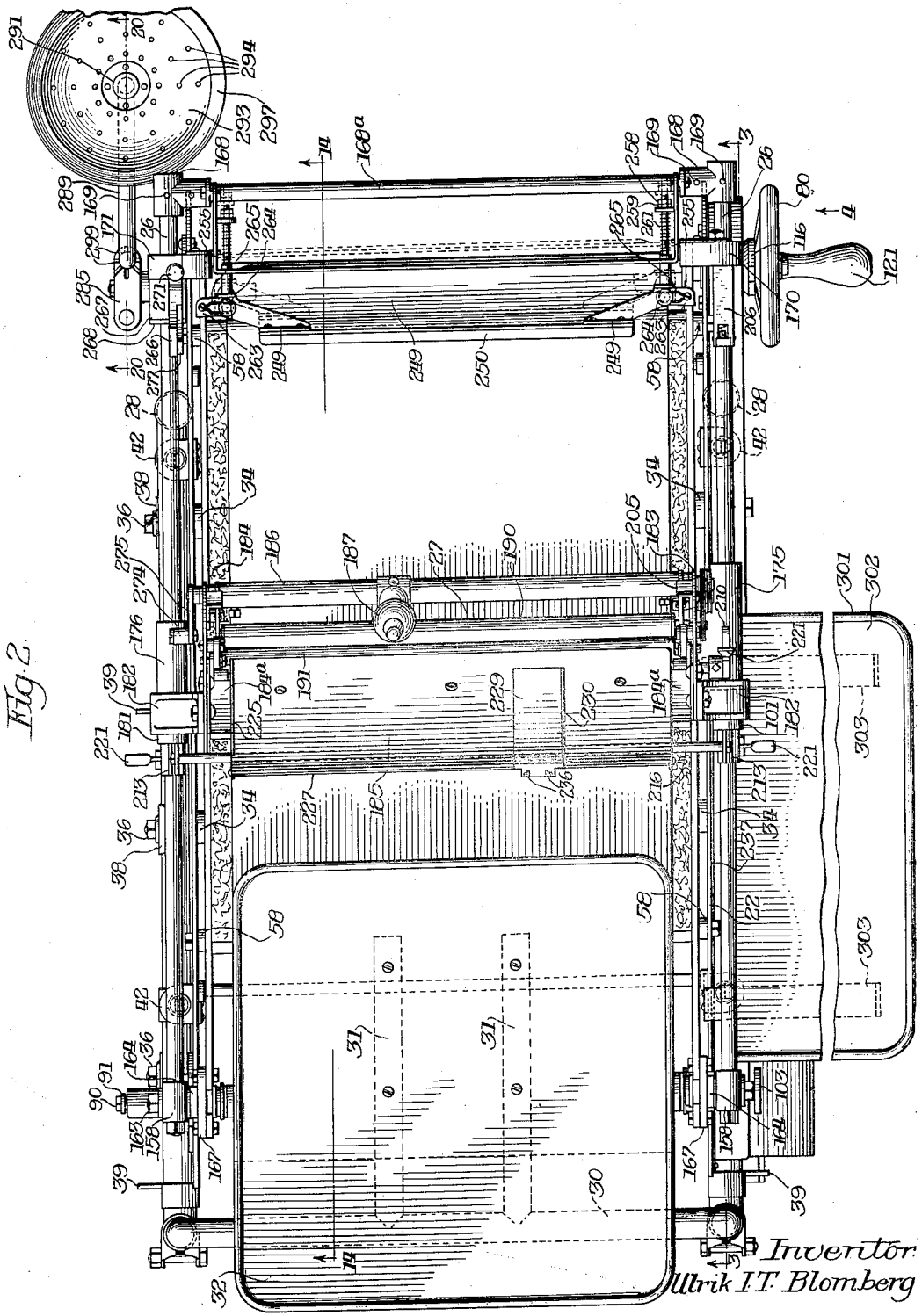

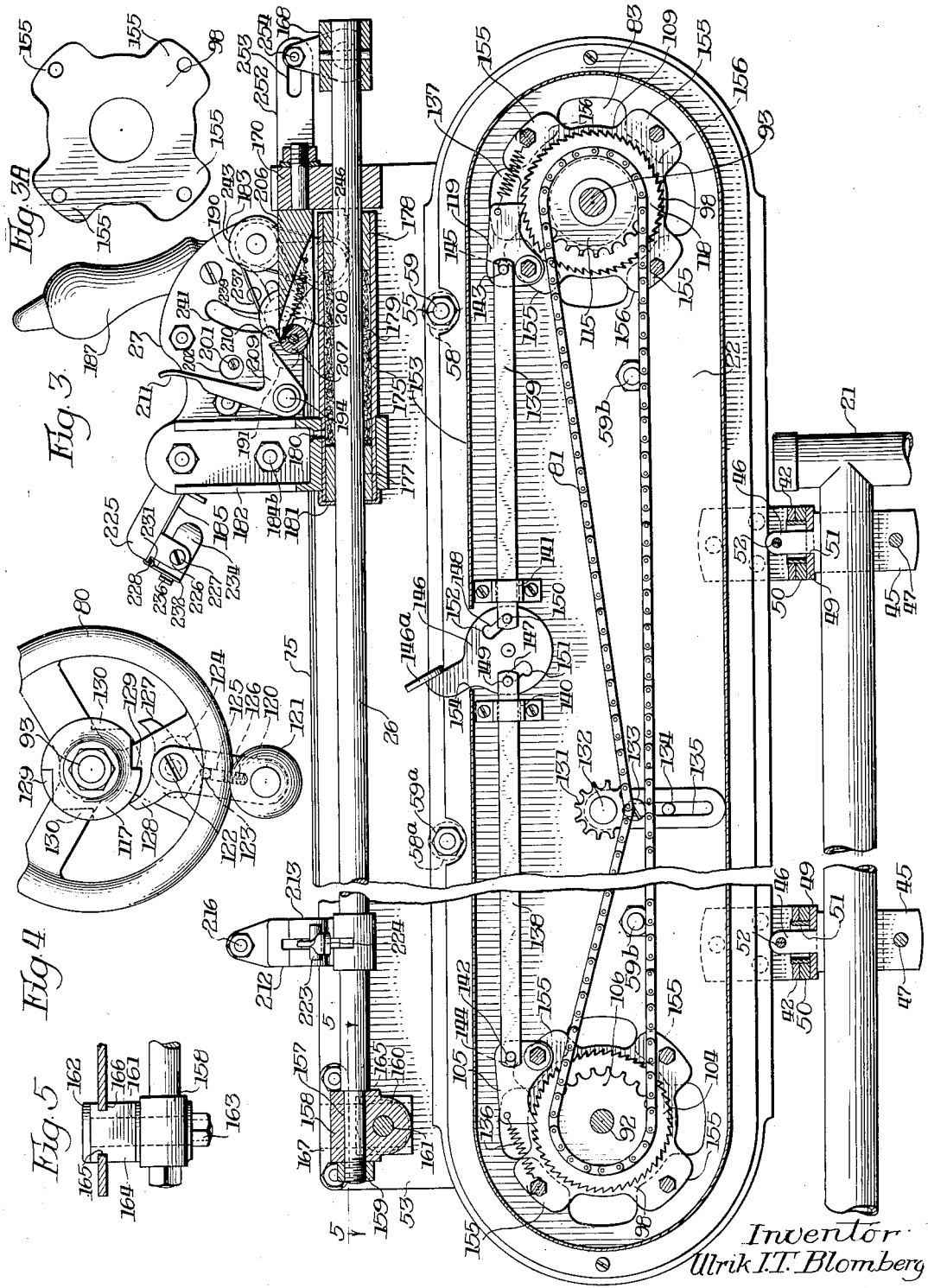

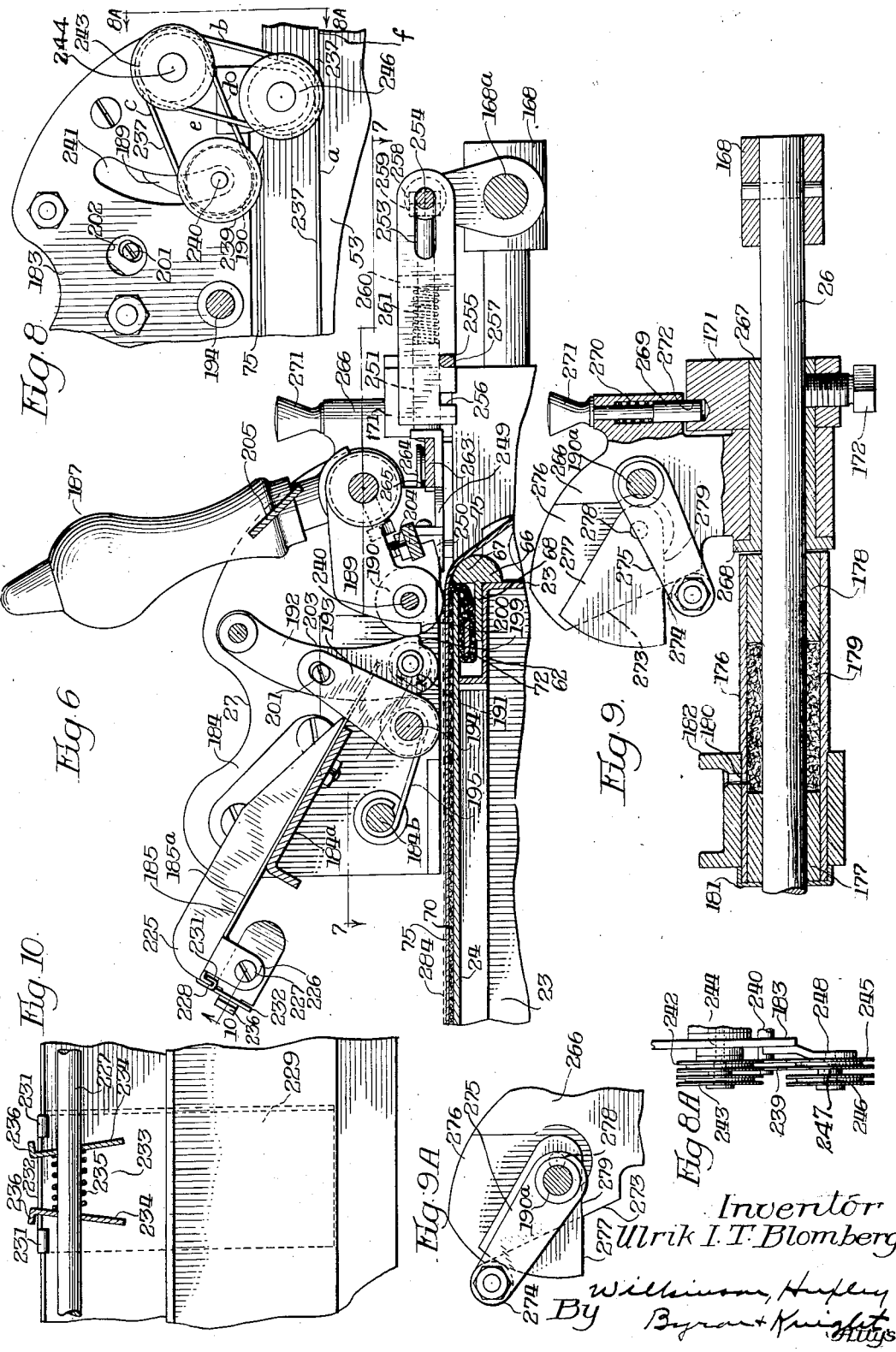

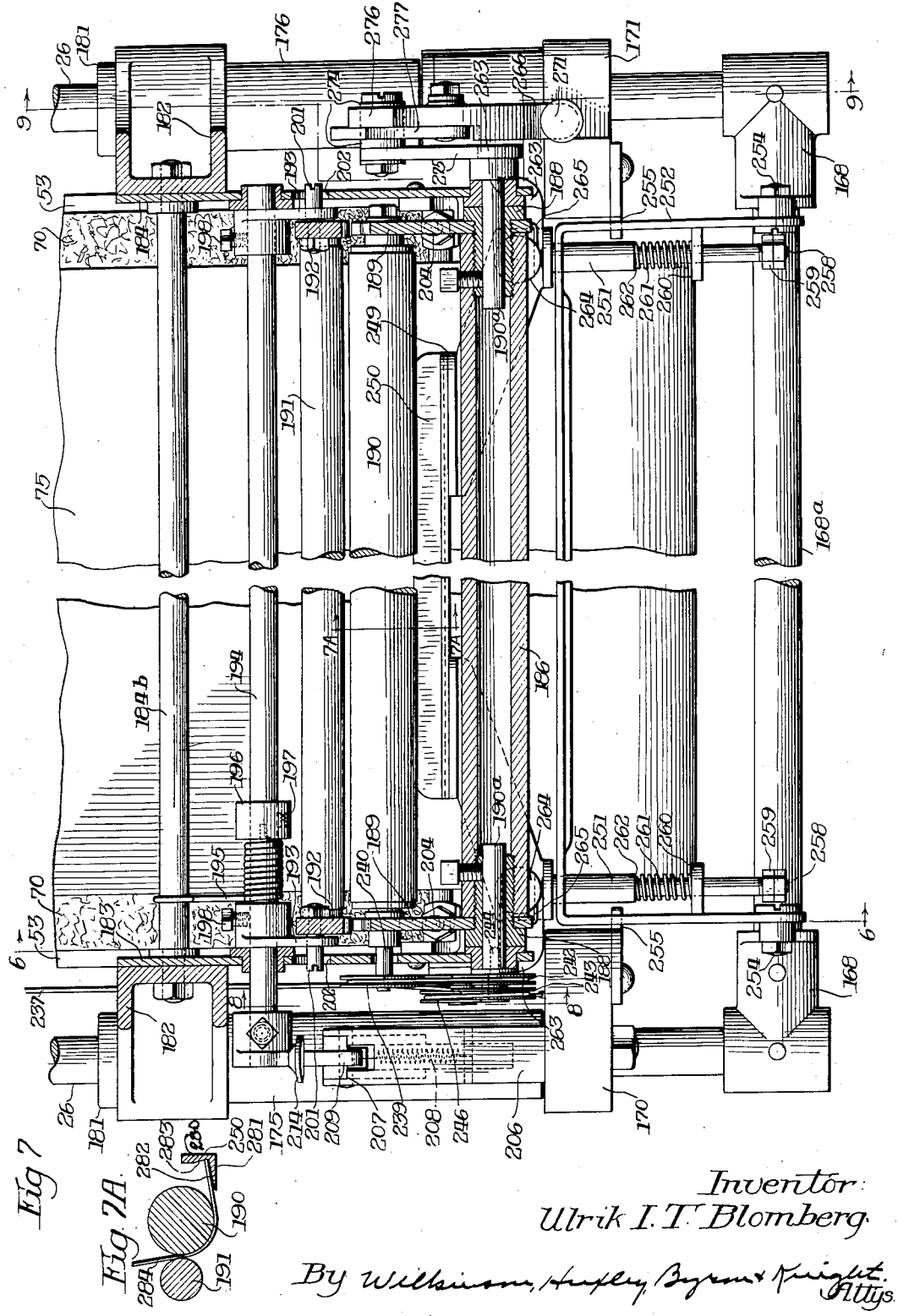

Jan. 23, 1934.  U. I. T. BLOMBERG  1,944,165
DUPLICATING MACHINE
Filed July 30, 1928  9 Sheets-Sheet 6
Fig. 11.
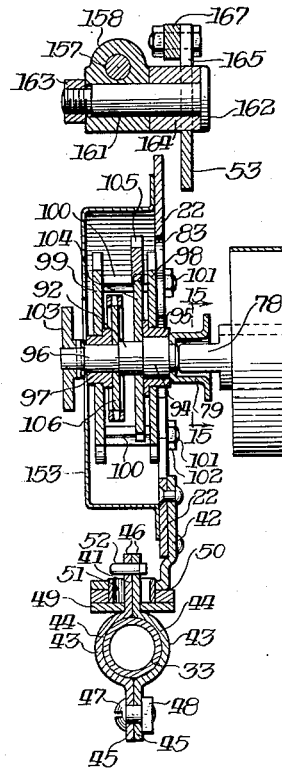
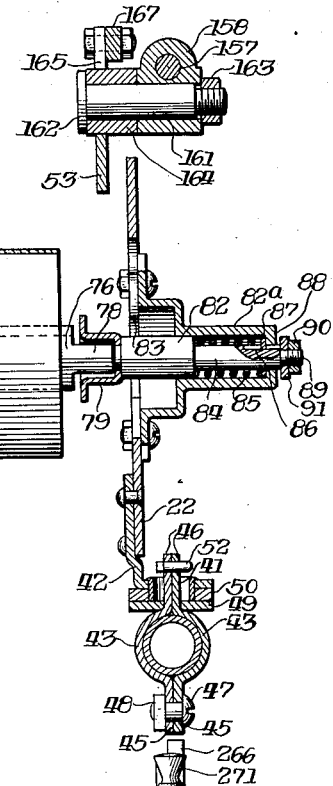
Fig. 12.
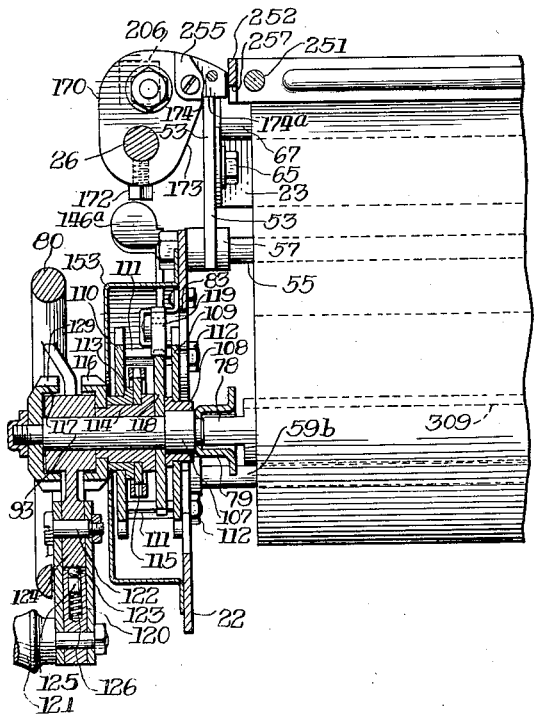
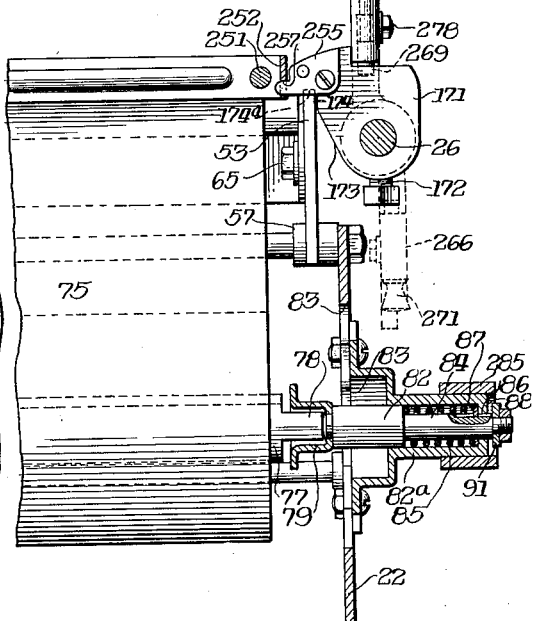
Inventor
Ulrik I. T. Blomberg
By Wilkinson, Huxley, Byron & Knight
Attys

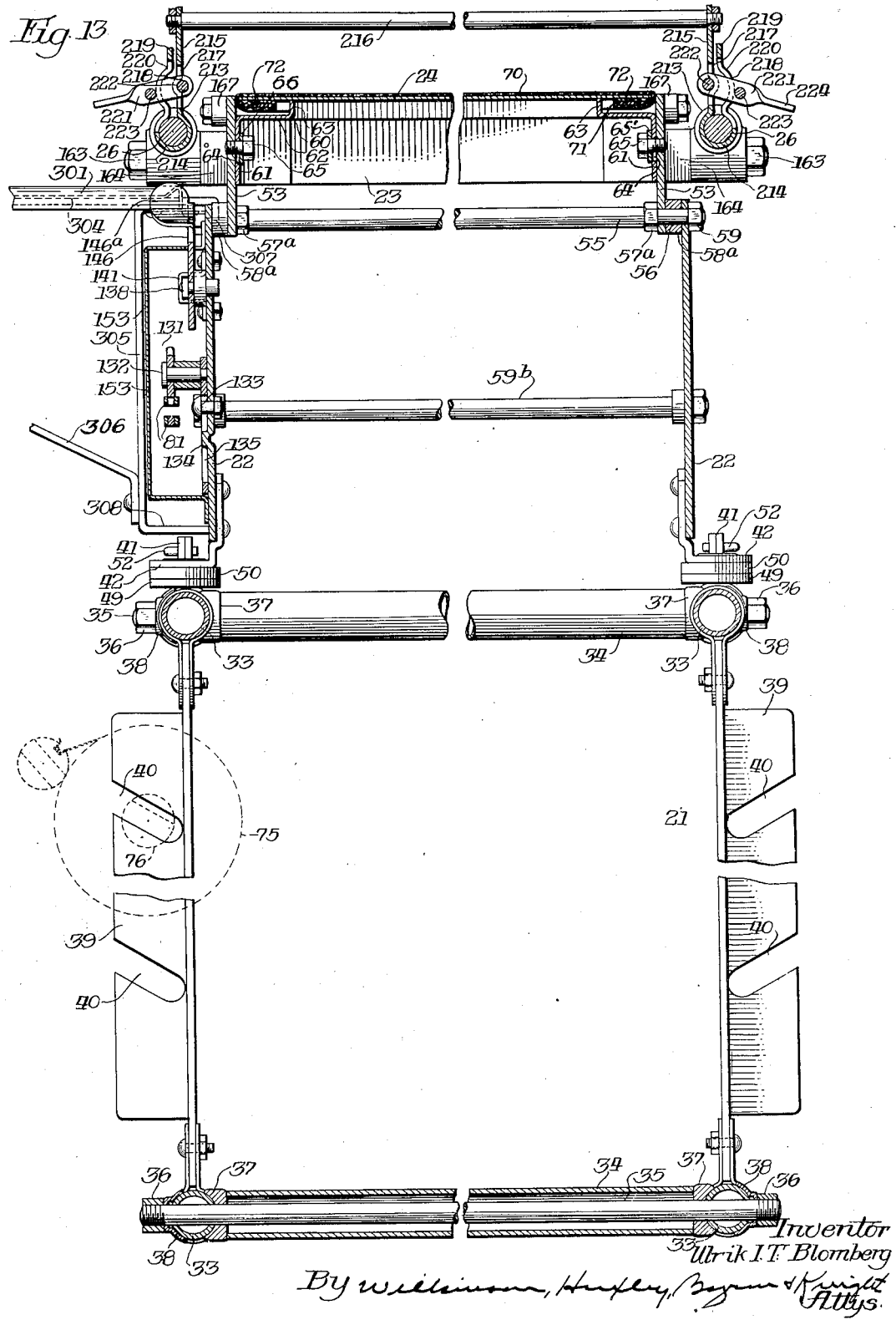

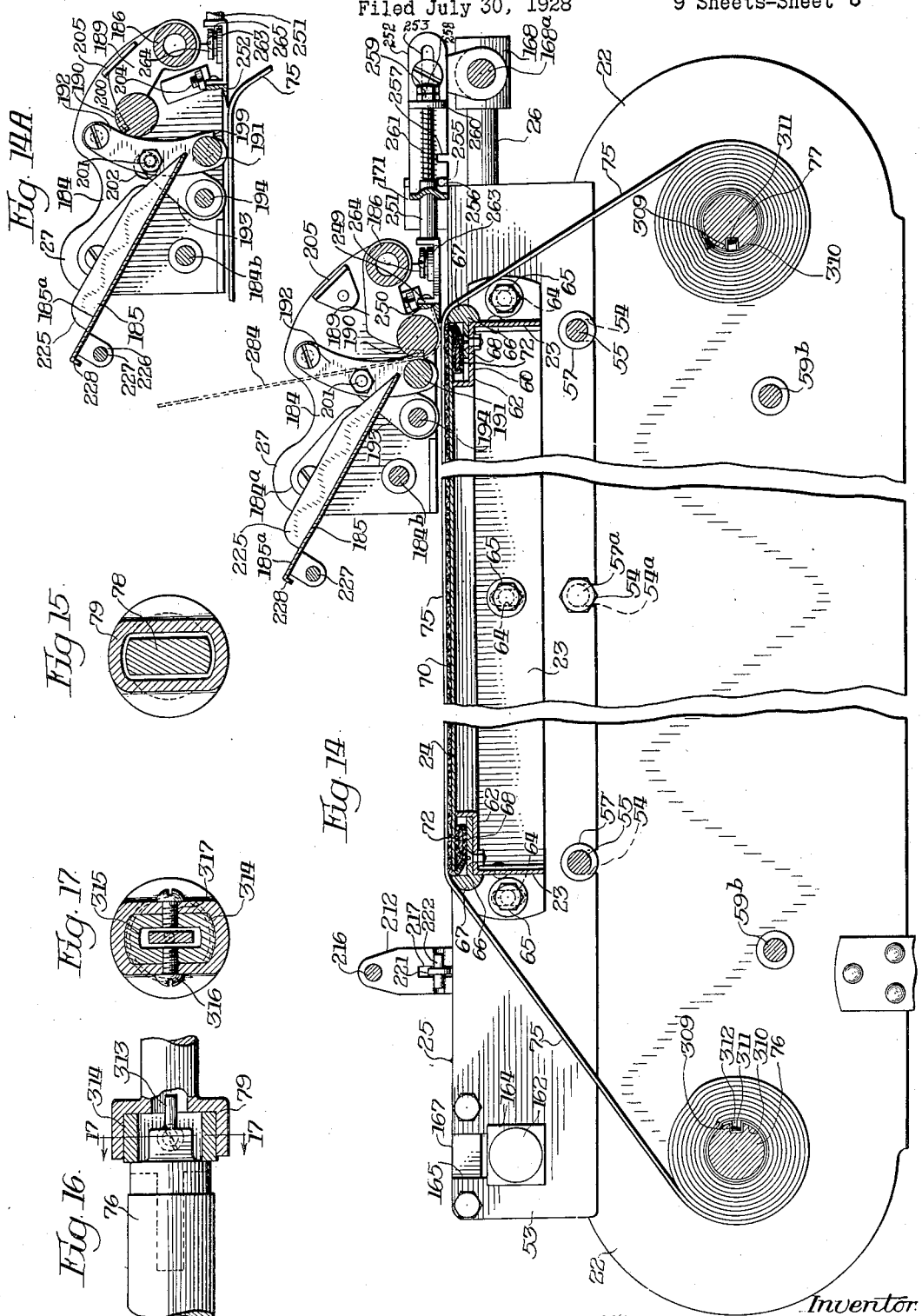

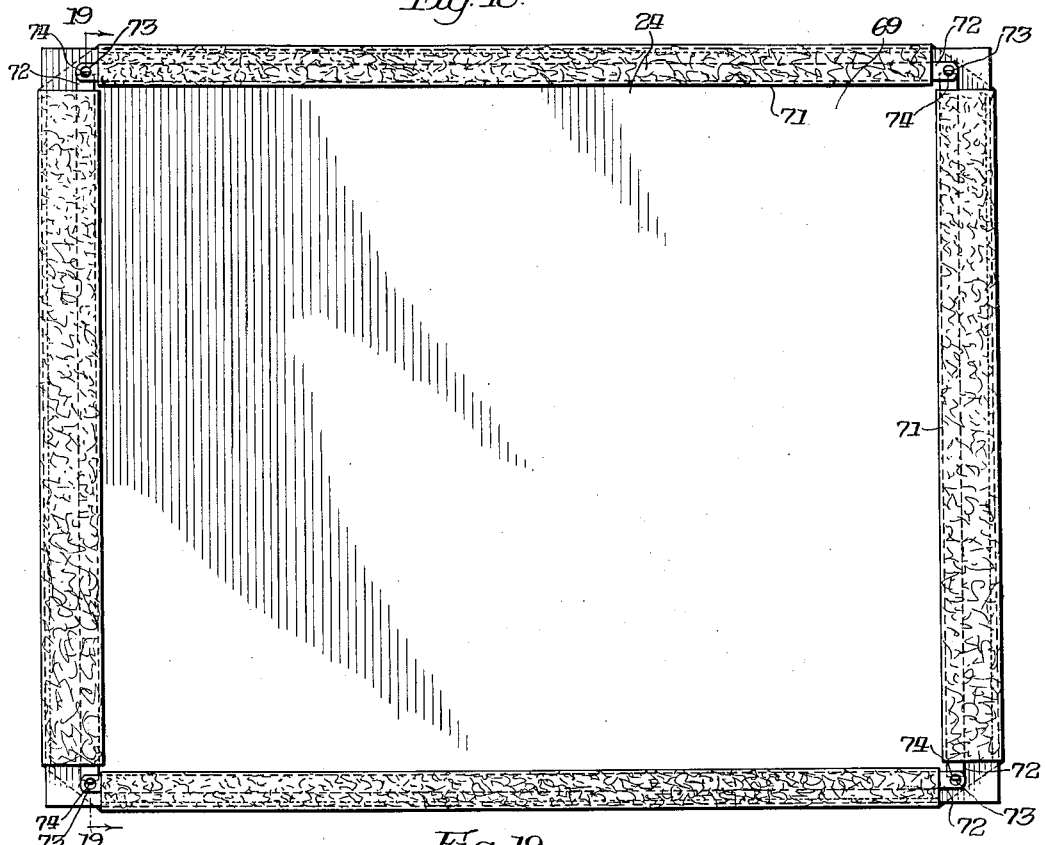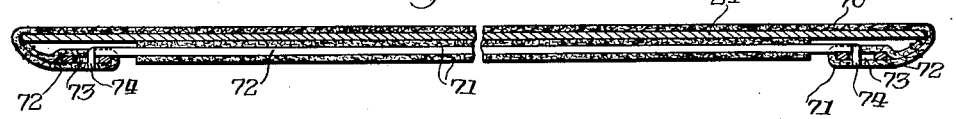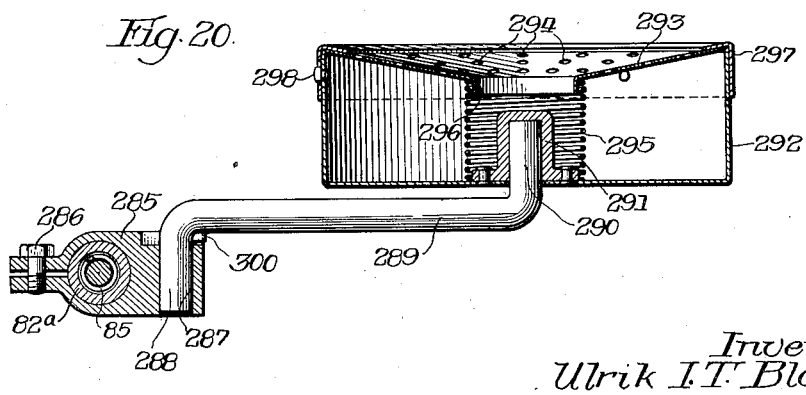

Patented Jan. 23, 1934

1,944,165

UNITED STATES PATENT OFFICE 1,944,165

DUPLICATING MACHINE

Ulrik I. T. Blomberg, Enskede - Stockholm, Sweden, assignor to Ditto, Incorporated, Chicago, Ill., a corporation of West Virginia Application July 30, 1928. Serial No. 296,127

86 Claims. (Cl. 101—133)

The present invention relates to duplicating machines.

More particularly the present invention relates to improvements in duplicating machines which operate upon the hectograph principle. It has for one of its objects the provision of such a machine which is sturdy in construction, relatively simple to manufacture and not likely to cause trouble in service.

A further object of the present invention is to provide a machine of the character referred to in which uniform results may be had regardless of differences in thickness of the paper or other material being handled.

A further object is to provide a machine of the character referred to which is positive in its action and well adapted to meet the needs of commercial service.

A further object is to provide an improved machine of the character referred to which has the advantage that printing may be accomplished to the very extremities of the sheet.

A further object is to provide a hectograph duplicating machine which holds the paper securely against slipping in service and which gives improved uniformity of results over prior practice.

A further object is to provide a hectograph duplicating machine capable of operation with the usual gelatine bands in the form of rolls, which rolls may be applied from either end of the machine and which may be conveniently manipulated to keep same taut.

A further object is to provide a hectograph duplicating machine capable of handling rolls of gelatine band, which rolls may be conveniently fed either forwardly or reversely, which machine is provided with convenient means for keeping said band taut at all times.

A further object is to provide an improved hectograph duplicating machine having improved means for rolling the paper into contact with the gelatine band, which will prevent the creeping of said paper upon the gelatine band, thereby avoiding annoyances which have been present in certain machines as hertofore manufactured and used.

A further object is to provide a hectograph duplicating machine having improved mechanism for gripping the paper whereby the holding rolls for said paper are kept out of gripping engagement with said paper until said paper is brought into gripping relationship with the gelatine band.

A further object is to provide an improved hectograph duplicating machine which will insure correct registration of print regardless of paper thickness.

A further object is to provide a duplicating machine in which the paper is uniformly gripped throughout the width thereof during the operation of said machine.

A further object is to provide a duplicating machine having improved mechanism for releasing the holding rollers from the paper.

A further object is to provide a duplicating machine having means for positively moving the roller for impressing the paper upon the gelatine band, which means is simple and not likely to get out of order in service.

A further object is to provide a duplicating machine having a roller for pressing paper upon the gelatine band, together with cable means for positively operating said roller, said machine having the advantage that the wear and tear upon said cable is reduced to a minimum.

A further object is to provide a duplicating machine having an improved carriage for handling the paper and impressing same upon the gelatine band, which carriage is provided with an improved paper guide.

A further object is to provide a duplicating machine in which the carriage or other device for carrying the impression roller has a floating action, whereby to adjust itself to conform to various dimensions of paper being handled.

A further object is to provide a duplicating machine having novel stop means for controlling the range of movement of the operating carriage.

A further object is to provide a duplicating machine which without any but simple movements is adapted for either margin or marginless work.

A further object is to provide a duplicating machine in which the operating carriage or other device for moving the paper into contact with the gelatine band can be readily swung out of operative position, allowing ready access to the bed of the machine for replacement or repairs.

A further object is to provide a duplicating machine in which the carriage mechanism for impressing the paper upon the gelatine band is combined in a single unit, which is capable of impressing a uniform force upon the paper regardless of paper thickness.

A further object is to provide a duplicating machine having an improved bed plate construction whereby the bed plate may be readily adjusted as to height, thereby facilitating change from the ordinary opaque bed plate to the transparent type of bed plate, or vice versa.

A further object is to provide a duplicating machine having the advantages recited in the immediately preceding paragraph which has the advantage that the threshold for said bed plate presents no sharp corners.

A further object is to provide an improved margin bar which will involve no sharp corners or crimps in the paper to be operated upon.

A further object is to provide an improved bed plate for a duplicating machine, which bed plate comprises cloth stretched over a stiff framework, which cloth may be readily removed and replaced when necessary.

A further object is to provide a duplicating machine having an improved bed plate, which bed plate is simple in construction and is held securely in position without the use of bolts or other fastening devices extending through said bed plate.

A further object is to provide a duplicating machine having a bed plate unit mounted upon a supporting frame, said unit and supporting frame cooperating in novel fashion, whereby the support is simple but sturdy.

A further object is to provide a duplicating machine having a plurality of means for receiving spindles for winding or unwinding a gelatine roll, together with simple means located in a convenient position for selectably communicating a winding movement to one or the other of said spindles.

A further object is to provide a duplicating machine in which material is conserved.

A further object is to provide a duplicating machine whereby gelatine rolls not in service may be conveniently mounted upon the frame of the machine.

A further object is to provide an improved duplicating machine to which operating side tables may be conveniently attached.

A further object is to provide novel method and means for rolling the paper into contact with the hectograph band.

Further objects will appear as the description proceeds.

Referring to the drawings—

Figure 2 is a top plan view of the machine illustrated in Figure 1;

Figure 3 is a sectional view taken along the planes indicated by the section lines 3—3 of Figure 2;

Figure 3A is a view illustrating a detail of construction relating to the conserving of material;

Figure 4 is a view in side elevation of the handle construction shown in Figure 1, said view being taken in the direction of the arrow 4 of Figure 2;

Figure 5 is a sectional view taken along the plane indicated by the section lines 5—5 of Figure 3;

Figure 6 is a sectional view taken along the planes indicated by the section lines 6—6 of Figure 7;

Figure 7 is a sectional view taken along the planes indicated by the section lines 7—7 of Figure 6;

Figure 7A is a sectional view taken along the planes indicated by section lines 7A—7A of Figure 7;

Figure 8 is a view showing a detail of construction looking in the direction of the arrows 8—8 of Figure 7;

Figure 8A is a view showing detail of construction looking in the direction of the arrows 8A—8A of Figure 8;

Figure 9 is a sectional view taken along the planes indicated by the section lines 9—9 of Figure 7;

Figure 9A is a detail of construction;

Figure 10 is a sectional view taken along the plane indicated by the section lines 10—10 of Figure 6;

Figure 11 is a sectional view taken along the planes indicated by the section lines 11—11 of Figure 1;

Figure 12 is a sectional view taken along the planes indicated by the section lines 12—12 of Figure 1;

Figure 13 is a sectional view taken along the planes indicated by the section lines 13—13 of Figure 1;

Figure 14 is a sectional view taken along the planes indicated by the section lines 14—14 of Figure 2, but showing the parts arranged for standard margin work;

Figure 14A illustrates a portion of the structure shown in Figure 14 but with the impression roller in elevated position.

Figure 15 is a sectional view taken along the plane indicated by the arrows 15—15 of Figure 11;

Figure 16 is a sectional view illustrating in longitudinal section the socket shown in Figure 15, but having applied thereto an adapter for receiving a different type of spindle end from that shown in Figure 15;

Figure 17 is a sectional view taken along the plane indicated by the section lines 17—17 of Figure 16;

Figure 18 is a bottom plan view of a bed plate embodying the principles of the present invention;

Figure 19 is a sectional view taken along the plane indicated by the section lines 19—19 of Figure 18; and Figure 20 is a sectional view taken along the plane indicated by the arrows 20—20 of Figure 2.

Figure 1:
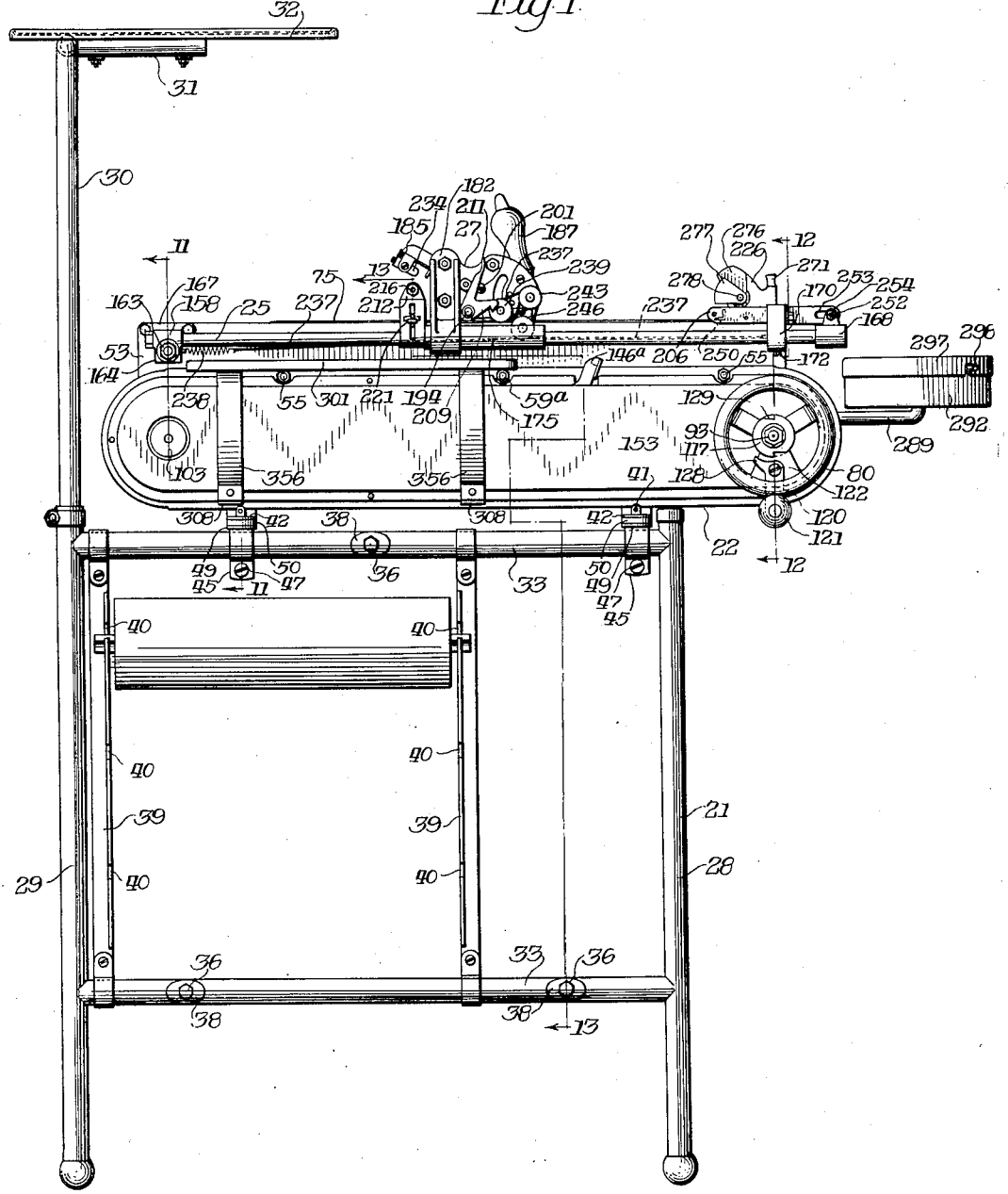
Figure 1 is a view in side elevation of one embodiment of the present invention.

The numeral 21 indicates a stand, which may comprise a framework made up of simple elements for supporting the side frames 22—22, which side frames are secured together in fixed spaced relationship by rods, which will be referred to further hereinafter.

Carried by the side frames 22—22 is a bed plate unit, indicated as a whole by the numeral 23, which bed unit includes the bed plate 24, which in practice preferably takes the form of a flat steel plate having a suitable covering for forming an abutment for the gelatine band.

Pivotally secured to the bed plate unit is the carriage unit, indicated as a whole by the numeral 25, which carriage unit is pivoted in floating bearings for purposes which will be referred to further hereinafter. Said carriage unit includes the side rods 26—26, which side rods preferably are round in cross section. Slidably supported upon said side rods 26—26 is the carriage assembly, which is indicated as a whole by the numeral 27.

Reverting now to the stand 21, said stand may be cheaply and sturdily constructed of tubing. It will be noted that the forward portion of the stand 21 is formed of the vertical tubes 28—28, and the rear portion of the stand is provided by the tubes 29—29. The numeral 30 indicates a yoke member having its extremities telescoping within the tubes 29—29, clamps being provided whereby the vertical position of the yoke 30 may be set as preferred. Secured to the upper portion of the yoke 30, by welding or otherwise, are a pair of short tubes 31—31. Said yoke 30 and tubes 31—31 form a support for the flat table 32. The front and rear tubes 28 and 29 are connected by the fore and aft tubes 33—33, which fore and aft tubes may be braced by cross tubes 34, which cross tubes house the rods 35, which are screw-threaded at their extremities for the reception of nuts 36—36. Washers 37—37 are provided between the extremities of the tubes 34 and the fore and aft tubes 33, and washers 38—38 are provided between the nuts 36—36 and said fore and aft tubes 33—33. By reason of the threaded rods 35—35 and the nuts 36—36, the stand may be readily dismantled for shipment, the yoke 30 being readily removable from the tubes 29—29. Secured to the fore and aft members 33 on one or both sides of the stand are the rack members 39—39, which rack members are provided with the slots 40—40, which slots have their axes disposed in inclined planes, the inner ends of said slots being lowermost. By reason of said racks 39—39, gelatine rolls not in use may be conveniently mounted at the side of the machine convenient to the hand of the operator. Secured to the upper fore and aft members 33—33 at the two sides of the stand 21 are the studs 41—41, which studs are adapted to seat themselves within holes in the feet 42—42 secured to the side frames 22—22. Said studs 41—41 are of novel construction.

Reference may now be had to Figures 3 and 11. As shown in Figure 11, each of the studs 41—41 is made up of a pair of clamping members 43—43, each having a semi-circular portion 44 adapted to fit around the corresponding fore and aft member 33. Each of said semi-circular portions 44—44 is provided at its two extremities with the lug portions 45 and 46. The lug portions 45—45 of the two cooperating clamping members 43—43 may be secured together by means of a bolt 47 having the nut 48. The lugs 46—46 are of less width than the lugs 45—45, and the two lugs of each clamping member 43 are adapted to be held together on the top side of the corresponding fore and aft member 33 by means of the washer 49. It will be clear without detailed explanation that the washer 49 in cooperation with the bolt 47 and nut 48 will hold the two clamping members 43—43 in tight engagement with the corresponding fore and aft member 33, whereby the stud 41 formed by said clamping members 43—43 will remain in fixed adjusted position after having once been set.

The feet 42—42 secured to the side frames 22—22 (see Figure 13) are provided with the washers 50—50, which may be of rubber or other cushioning material. Said washers 50—50 are secured to the legs 42 by means of ferrules 51—51, which ferrules 51 provide the holes for receiving the studs 41. If preferred, the upper portions of the lugs 46—46 may be apertured for the reception of a cotter pin 52 for locking the side frames 22—22 to the stand 21.

The bed plate unit 23 will now be described. Said bed plate unit comprises the two side plates 53—53, which may be flat pieces of steel. As indicated in Figures 2, 13 and 14, said side plates 53—53 are notched on their under sides, as indicated by the numerals 54—54, to take over the cross bars 55—55. As shown in Figure 13, the cross bars 55—55 have their extremities of reduced diameter, as indicated by the numeral 56. Driven upon the portions 56—56 are the collars 57—57, which collars abut against the inner surfaces of the plates 53—53. It is preferred to mount the collars 57—57 with a drive fit. By reason of this construction the portions 56 need be reduced only a very small amount from the diameter of the main portion of the corresponding cross bar 55, and still no danger is encountered that the collar 57 will be jammed onto the larger portion of the cross bar 55. Located outwardly of the plates 53—53 are the spacers 58—58, which spacers contact with the inner surfaces of the side frames 22—22. The extremities of the cross bars 55—55 are threaded for the reception of the nuts 59—59 (Figure 3). By reason of the slotted construction of the plates 53—53 it is a simple matter to set the bed plate unit 23 between the side frames 22—22 upon said cross bars 55—55 and to secure said bed plate unit in place. Plates 53—53 are also provided on their lower edges, intermediate of the length of said plates 53—53, with vertical open ended slots 54a—54a. Bolts 57a—57a, disposed in said slots in cooperation with nuts 59a—59a (Figure 3), secure said plates 53—53 to the side frames 22—22 intermediate of the length of the machine. Reenforcing rods 59b—59b may be provided for bracing the lower portions of the side frames 22—22.

Disposed between the plates 53—53 is the bed plate frame 60, which frame is a rectangular structure having the vertically disposed walls 61—61. The shape of said frame will be clear from an inspection of Figures 13 and 14. The side walls 61—61 adjacent to the side plates 53—53 have a sliding fit relative to said side plates 53—53. Contiguous to said walls 61—61 are the substantially horizontal portions 62—62, the inner edges of which are bounded by the upstanding walls 63. Said upstanding walls 63—63 form a continuous rectangular edge portion spaced inwardly from the side plates 53—53 and adapted to engage the under side of the bed plate 24. By reason of the spacing of the edge portions 63—63 inwardly from the side plates 53—53, the advantage is had that no interference is had between said edge portions 63 and the securing means for the cover of the bed plate, which securing means and cover will be described in detail hereinafter.

As indicated in Figure 14, the side walls 61—61 adjacent to the side plates 53—53 are provided with vertical slots 64—64 for the reception of bolts 65—65. Said bolts are provided with washers 65'—65', which washers engage the inner surfaces of the walls 61—61. The extremities of said bolts 65—65 are threaded into said side plates 53—53.

By reason of the slotted construction immediately above referred to, vertical adjustment is provided for the bed plate frame 60. This is important in practice, for the reason that it may be preferred to use bed plates having different thicknesses. For example, under ordinary circumstances an opaque bed plate 24 will be used, which bed plate will be relatively thin, whereby to reduce the amount of material to a minimum. Under other circumstances it will be preferred to use a transparent bed plate, a light being provided beneath said bed plate. In order to provide this transparency, glass or other transparent material will be used, which glass or other material will necessarily have greater thickness than the opaque bed plate. By reason of the slotted construction involving the slots 64 and the bolts 65, the level of the upper face of the bed plate 24 may be adjusted as desired. By reference to Figure 14, it will be noted that both ends of the bed plate frame 60 are provided with the thresholds 66—66. Each of said thresholds takes the form, in cross section, of a half circular head portion 67 and the flat portion 68, which flat portion 68 is secured by screws or otherwise to the horizontal portion 62 of said bed plate frame 60. It will be obvious that the upper portion of the threshold 67 should be maintained at a uniform level regardless of whether or not a thick or thin bed plate 24 is being used. Expressed in other language, whether the bed plate frame 60 is at a high or a low level, the upper extremity of the threshold 67 should be approximately at the level of the top portion of the bed plate 24, or only slightly below said level. In order to adjust the threshold relative to the bed plate frame 60, shims or the like may be inserted between the portion 68 of the threshold 67 and the horizontal portion 62 of the bed plate frame 60. It will be noted that the bed plate 24 is secured in position without any bolts or other fastenings. A threshold 67 is provided at each end of the bed plate to hold said bed plate against longitudinal movement. Said bed plate 24 lies between the side plates 53—53, whereby said bed plate 24 is prevented from having any crosswise movement. The bed plate may be readily removed and replaced.

The bed plate 24 will now be described. The illustrated embodiment of the bed plate 24 (Figures 18 and 19) takes the form of a flat steel plate 69, which is rectangular in shape. Stretched flatwise across the upper surface of the steel plate 69 is a piece of billiard cloth or equivalent flexible material 70. The billiard cloth cover 70 may be formed from a rectangular piece of cloth having the corner portions thereof cut out, the edge portions between said corner portions being hemmed longitudinally, as indicated by the numerals 71—71 to provide sleeves. Disposed within said hems or sleeves 71 are the steel strips 72, the extremities of which strips 72 have interfitting lugs and recesses. In the form illustrated, the strips 72—72 located along the long sides of the steel plate 69 are provided with apertures 73 in their extremities. The strips 72 located along the short sides of the steel plate 69 are provided with formed lugs 74 seating within said apertures. It will be clear from an inspection of Figures 18 and 19 that the cover 70 may be readily disposed upon the steel plate 69 stretched taut thereon and securely held in position. In mounting the cover 70 upon the steel plate 69, the operator will stretch the cloth sufficiently to allow the lugs 74 to seat themselves within the apertures 73, and the natural tension of the cloth will hold said lugs securely within said apertures. Removing the cloth is, of course, equally simple.

The means for mounting and operating the gelatine band roll will now be described, reference being had particularly to Figures 1, 3, 4, 11, 12, 14 and 15. As best shown in Figure 14, the preferred embodiment of the present invention involves a gelatine band 75 having spindles 76 and 77 secured to the two extremities thereof. Said spindles 76 and 77, in the preferred embodiment of the present invention, have milled end portions, indicated by the numeral 78. Said spindle ends 78—78 are adapted to be non-rotatably seated within sockets 79, which sockets will be referred to further hereinafter. The spindles 76 and 77 may be of wood and the milled end portions 78 may be relatively sturdy. A preferred means for securing the ends of the gelatine band 75 to the spindles 76 and 77 will be referred to in detail hereinafter.

The two spindles 76 and 77 are meant to be alternatively positively operated for winding the gelatine band toward the forward end of the machine, or winding said gelatine band toward the opposite end of the machine. A hand wheel 80 is provided for alternatively winding the gelatine band 75 in one or the other of said directions. Said hand wheel operates, through connections which will be presently described, to drive a sprocket chain 81 (see Figure 3), which sprocket chain is disposed upon one side of the machine, which is the left side as the parts are viewed in Figures 11 and 12. In the description which follows, the term "chain side of the machine" will be understood to mean the left-hand side as the parts are viewed in Figures 11 and 12, and the other side of the machine will be referred to as the side opposite to the chain side.

By reference to Figures 11 and 12 it will be noted that the sockets 79—79 for receiving the ends of the spindles 76 and 77, respectively, at the right hand side of the machine, are carried by longitudinally movable shafts 82—82, which shafts are slidably carried by housings 82a—82a secured by bolts or other convenient securing means to the adjacent side frame 22, said side frame being provided with apertures 83—83 for permitting passage of said shafts 82—82. Said apertures 83—83 are of novel conformation for the purpose of saving material and will be referred to further hereinafter. The shafts 82—82 have reduced portions 84—84 for the reception of the coil springs 85—85. The reduced portion 84 of each shaft 82 is provided throughout a portion of its length with a longitudinally extending groove 86, which groove is adapted to receive a tongue of the washer 87, whereby said washer is non-rotatably mounted upon its shaft 82, though said washer is slidable longitudinally of its shaft 82. Each washer 87 bears against the end wall 88 of its housing 82a. The extremities of the shafts 82—82 may be screw-threaded, as indicated by the numerals 89—89, for the reception of the nuts 90—90, which in cooperation with the washers 91—91, limit inward movement of the shafts 82—82. It will be clear without detailed explanation that the sockets 79—79, at the right hand side of the machine as the parts are viewed in Figures 11 and 12, are urged by the springs 85—85 toward the inner limits of travel of said sockets 79—79. The sockets 79—79 at the chain side of the machine (that is, the left-hand side of the machine as the parts are viewed in Figures 11 and 12,) are carried by the shafts 92 and 93. Said shafts 92 and 93 extend through apertures 83—83 in the left-hand side frame 22, which apertures are preferably identical in size and shape with the apertures 83—83 in the right-hand side frame 22. Said shafts 92 and 93 differ in configuration and function and will be separately described. Referring first to the shaft 92, which is located adjacent to the rear end of the machine, and referring particularly to Figure 11, it will be noted that said shaft has a journal portion 94 rotatably mounted within the bushing 95. Said shaft also has the journal portion 96 rotatably mounted within the bushing 97. Said bushings 95 and 97 are pressed into or otherwise non-rotatably secured to housing plates 98 and 99, respectively. Said housing plates 98 and 99 are rigidly secured together by means of the studs 100—100, which studs are screw-threaded, as indicated by the numerals 101—101, for the reception of nuts 102—102, whereby said housing plates 98 and 99 and the parts carried thereby are rigidly but removably carried by the adjacent side frame 22. Secured to the shaft 92 at the outer extremity thereof is the knob 103, (Figures 1, 2 and 11) whereby said shaft 92 may be manually turned independently of the hand wheel 80. Non-rotatably carried by the shaft 92 is the ratchet wheel 104 adapted to cooperate with a swinging dog 105 (Figures 3 and 11). Also non-rotatably carried by the shaft 92 is the sprocket wheel 106 through which said shaft may be positively driven by means of the sprocket chain 81.

Referring now to shaft 93 at the front end of the machine (see Figure 12), it will be noted that said shaft includes a journal portion 107, rotatably mounted within the bushing 108, which is pressed into or otherwise secured within the housing plate 109. The numeral 110 indicates a housing plate similar in size and shape to the housing plate 109 and to the housing plates 98 and 99. Said housing plates 109 and 110 are rigidly secured together by means of the studs 111—111, said housing plates 109 and 110 being rigidly but removably secured to the adjacent side frame 22 by means of the nuts 112—112, similar to the construction discussed above in connection with the housing plates 98 and 99. The housing plates 98, 99, 108 and 109 are of novel configuration and will be referred to more in detail hereinafter when the apertures 83 are being described. Non-rotatably secured to the housing plate 110 is the bushing 113, which provides a bearing for the sleeve 114, which sleeve 114 constitutes a bearing for a portion of the shaft 93 outwardly of the journal portion 107. Said sleeve 114 has rigidly secured thereto the sprocket wheel 115 and the clutch member 116. Non-rotatably secured to the shaft 93 at the outer extremity thereof is another clutch member 117. As will be described hereinafter, said clutch members 116 and 117 are adapted to alternatively cooperate with the hand wheel 80 to cause winding of the gelatine band either toward the front end or the rear end of the machine. As shown in Figure 12, the hand wheel 80 is rotatably mounted upon the shaft 93. Fixedly secured to the shaft 93 is the ratchet wheel 118 adapted to cooperate with the swingingly mounted dog 119.

Swingingly carried by the hand wheel 80 (Figure 4) is the rocking handle arm 120 carrying the outstanding finger hold 121. Said handle arm 120 is swingingly carried by the pin 122, which pin is rigidly carried by the hand wheel 80 and has its axis parallel with the axis of said hand wheel 80. Carried by the handle arm 120 is the spring-pressed detent 123 adapted to cooperate with the cam 124, which cam 124 is rigid with the hand wheel 80. If the hand wheel 80 is restrained from turning movement, said handle arm 120 may be moved throughout a small arc to one side or the other of the radial plane containing the axes of the hand wheel 80 and the pin 122. By reason of the spring-pressed detent 123, said handle arm will be yieldingly held in the position to which it is moved relative to said plane. The spring-pressed detent 123 in a preferred embodiment of the present invention takes the form of a ball adapted to seat against a plunger 125, which plunger is urged toward the axis of the pin 122 by the coil spring 126. The cam 124 may be cast integral with the hand wheel 80. Rocking movement of the handle arm 120 relative to the hand wheel 80 may be limited by shoulders or other abutments (not shown) integral with the hand wheel 80.

Carried by the handle arm 120 are the dogs 127 and 128 adapted to cooperate alternatively with the clutch members 116 and 117, above referred to. Referring to Figure 4, the clutch member 117 is shown in full lines. It will be noted that said clutch member 117 is provided with a plurality of recesses 129—129 spaced about the periphery of said clutch member 117. Said recesses 129 present abutting surfaces adapted to cooperate with the dog 128 when said dog is moved toward the axis of the hand wheel 80. The clutch member 116 is hidden from view in Figure 4, but said clutch member is provided with recesses 130—130, outlined in broken lines, which recesses present abutting shoulders to the dog 127 when said dog is moved toward the axis of the hand wheel 80. Expressed in other language, the clutch members 116 and 117 have reversely presented abutting faces adapted to cooperate alternatively with the dogs 128 and 127. If it is intended to move the hand wheel 80 in a clockwise direction, said hand wheel is momentarily held against rotation and the handle arm 120 is flipped in a clockwise direction. Movement of the handle 121 in a clockwise direction will cause the dog 128 to cooperate with the clutch member 117 to positively communicate clockwise movement to the shaft 93. Rotation of the shaft 93 in a clockwise direction as the parts are viewed in Figures 3 and 4 will communicate positive driving movement to the spindle 77 at the forward end of the machine, thereby winding the gelatine band 75 toward the forward end of the machine. If on the other hand it be desired to wind the gelatine band toward the rear end of the machine, the hand wheel 80 will be momentarily restrained from movement and the handle arm 120 will be flipped in a counterclockwise direction (see Figure 4). Movement of the handle 121 in a counterclockwise direction will cause engagement of the dog 127 with the clutch member 116. Inasmuch as clutch member 116 is fast to the sleeve 114, and inasmuch as said sleeve 114 has fixed thereto the sprocket 115, counterclockwise movement of the handle 121 will result in the counterclockwise rotation of said sprocket wheel 115, communicating a positive driving movement to the sprocket wheel 106 at the rear of the machine through the chain 81. Inasmuch as said sprocket wheel 106 is fast to the shaft 96 at the rear of the machine, a positive winding movement is communicated to the spindle 76, resulting in the winding of the gelatine band toward the rear of the machine. It will be clear, therefore, that the hand wheel 80, through very simple mechanism, enables the operator to positively move the gelatine band in either direction at will. By reference to Figure 3 it will be noted that an idler sprocket 131 is provided adapted to cooperate with the sprocket chain 81. Said idler sprocket 131 is carried by the shaft 132, which shaft is supported by a bracket slidably carried by the adjacent side frame 22. Said bracket is adjustably held in fixed position by means of the screw 133. Said screw 133 and a guiding projection 134 are vertically slidable within a slot 135 in said side frame 22.

Reference may now be had to the detent means for holding the gelatine band taut, which detent means includes the ratchet wheels 104 and 118 and the swingingly mounted dogs 105 and 119. It will be noted from an inspection of Figure 3 that the teeth of the ratchet wheels 104 and 118 at the two ends of the machine are reversely directed. The dog 105 cooperating with the ratchet wheel 104 is urged by the spring 136 toward a position to prevent clockwise rotation of the ratchet wheel 104 as the parts are viewed in Figure 3. The dog 119 is urged by the spring 137 toward a position to prevent counterclockwise rotation of the ratchet wheel 118. Said dogs 105 and 119 are adapted to be moved and held out of cooperative relationship with their corresponding ratchet wheels 104 and 118 by means of certain mechanism which will now be described. Secured to the dog 105 by means of a pin and slot connection is the rod 138. Similarly secured to the dog 119 is the rod 139. Said rods 138 and 139 are guided by the straps 140 and 141, respectively. The pin and slot connections referred to include pins 142 and 143 secured to the rods 138 and 139, respectively. Said pins are adapted to have a slight movement within the slots 144 and 145, respectively. As the parts are viewed in Figure 3, said dogs are in operative position to prevent clockwise movement of ratchet wheel 104 and counterclockwise movement of ratchet wheel 118. Under these conditions the pin 142 is at the right-hand end of the slot 144 and the pin 143 is in the left-hand end of the slot 145. Under these conditions, if the ratchet wheel 104 is moved in a counterclockwise direction, the corresponding dog 105 may lift to permit such rotation without disturbing the position of the rod 138. In like manner, the dog 119 is adapted to lift to permit clockwise rotation of the ratchet wheel 118 without disturbing the corresponding rod 139. The rods 138 and 139 are positively moved toward and from one another by means of the cam plate 146, which cam plate 146 is provided with a finger hold 146a conveniently disposed at the side of the machine. Said cam plate 146 is pivotally supported by the adjacent side frame 22. Said cam plate 146 is provided with a pair of slots 147 and 148, of which the slot 147 is adapted to receive a pin 149 secured to the rod 138 and the slot 148 is adapted to receive the pin 150 carried by the rod 139. The cam slots 147 and 148 are so disposed within the cam plate 146 that when said cam plate is moved in a clockwise direction the rods 138 and 139 are drawn toward one another. The slots 147 and 148 are provided with recesses 151 and 152, respectively, whereby when the rods 138 and 139 are moved toward one another to the limit of their travel, the pins 149 and 150 will, respectively, seat themselves within said recesses 151 and 152, whereby said rods 138 and 139 will be releasably latched in position to hold the dogs 105 and 119 out of cooperative relationship with their corresponding ratchet wheels 104 and 118. The sprocket chain 81 and the operating mechanism therefor are housed within a thin sheet metal housing 153. Said housing 153 is provided with the aperture 154 to permit the swinging movement referred to of the cam plate 146 with its finger hold 146a.

Referring now to the apertures 83—83 in the side frame 22 opposite to the chain side of the machine and to the housing plates 98, 99, 109 and 110, said parts are designed to save material. It will be noted that there are two apertures 83—83 in the side frame 22 opposite to the chain side of the machine, that is, at the right-hand side of the machine as the parts are viewed in Figures 11 and 12, and that there are two corresponding apertures in the side frame 22 at the chain side of the machine, that is, the left-hand side as the parts are viewed in Figures 11 and 12. There are four housing plates 98, 99, 109 and 110. Said housing plates comprise the material punched out to form the apertures 83—83 in the left-hand side of the frame 22 as the parts are viewed in Figures 11 and 12, and the corresponding apertures 83—83 in the side frame 22 at the left-hand side of the machine as the parts are viewed in Figures 11 and 12. By reference to Figure 3 it will be noted that each of the housing plates 98, 99, 109, and 110 is provided with spaced, outwardly extending wings 155 secured to like inwardly extending wings 156 bounding the corresponding apertures 83 in the side frame 22. The conformation of each of the housing plates 98, 99, 109 and 110 is shown in Figure 3A. As noted above, said housing plates constitute punchings from the side frames 22. Accordingly, the apertures 83—83 in the two side frames 22—22 will have the same outline as that shown in Figure 3A. As indicated above, the housing plates 98 and 99 are rigidly secured together by means of the studs 100. Said wings 155—155 of one of said housing plates will be in alignment with the wings of the other of said housing plates, and said wings will be secured to the inwardly extending wings 156 of the adjacent side frame 22. Correspondingly, the housing plates 109 and 110 will be disposed with their wings 155—155 in registry, which wings 155—155 will be lined up with the inwardly extending wings 156 of the side frame 22.

The means for floatingly mounting the carriage unit 25 will now be referred to. Reference may be had to Figures 1, 2, 3, 5, 11, and 14. As noted above, said carriage unit includes the side rods 26—26. Said rods 26 normally occupy horizontal positions parallel with the top level of the bed plate 24. The rear extremity of the rods 26—26 have reduced portions 157 (Figure 3), which reduced portions are seated within pivot castings 158. The extremities of the reduced portions 157 are threaded for the reception of nuts 159. Said pivot castings have portions 160, each apertured to receive a bolt 161. By reference to Figure 5 it will be noted that the bolt 161 has the head 162 and the nut 163. Each bolt 161 is rotatably disposed within a corresponding aperture in a pivot block 164. Said pivot block 164 is vertically slidable within a slot 165, the block being slotted, as indicated by the numeral 166, to permit the vertical sliding movement referred to, while restraining said block against movement axially of the bolt 161. A strap 167 may be provided for limiting vertical movement of the pivot block 164. By reason of the vertically movable pivot blocks 164, it will be noted that the pivotal mounting means for the rods 26—26 are vertically movable; or, expressed in other language, said rods have floating pivots. As will be explained hereinafter, these floating pivots insure a uniform pressure in service regardless of the position and thickness (within limits) of the paper or other material being operated upon.

The means for mounting the rods 26—26 at their forward extremities will now be described. Secured to the forward extremities of each of the rods 26—26 is a casting 168. Said castings 168—168 are preferably identical and are provided with sockets for receiving said rods 26—26 and sockets for receiving the extremities of the brace rod 168a. Pins 169—169 are provided for holding said rods 26—26 and brace rod 168a within said castings 168—168, said pins preferably being tapered. Mounted upon the two rods 26—26 are the guide brackets 170 and 171. Said guide brackets are non-rotatably carried by the rods 26—26 by means of keys. Setscrews 172—172 are provided to hold said guide brackets 170 and 171 against longitudinal movement upon said rods 26—26. Said guide brackets 170 and 171 have converging inner guide walls 173—173, which guide walls are adapted to cooperate with the upper outer edges of the side plates 53—53. The upper extremities of the guide walls 173—173 are vertically disposed, as indicated by the numerals 174—174, which vertically disposed walls are adapted to embrace the outer surfaces of the side plates 53—53. Said brackets 170 and 171 have horizontal surfaces 174a—174a which rest upon the upper edges of the side plates 53—53 for supporting the front end of the carriage unit.

The carriage assembly 27 will now be described, reference being had particularly to Figures 1, 2, 3, 6, 7, 8, 9, 10 and 14. The carriage assembly 27 is slidably mounted upon the side rods 26—26. A pair of sleeves 175 and 176 are provided, which sleeves are slidably mounted upon the side rods 26—26 (Figures 2, 3 and 9). It will be noted that the sleeve 176 is a little shorter than sleeve 175. The reason for this difference will be referred to further presently. It will be noted from an inspection of Figures 3 and 9 that each of the sleeves 175 and 176 is provided with a pair of bushings 177 and 178, which are preferably of bronze. Said bushings 177 and 178 provide an annular pocket for the reception of felt 179, or the like, which felt forms a convenient carrier for lubricant. Lubricant may be supplied to the felt 179 through the aperture 180. The rear end of each of the sleeves 175 and 176 is provided with a cap 181, which may be of steel for the purpose of taking the shocks incident to moving the carriage assembly up against a stop member, disposed rearwardly of the carriage assembly, which stop member will be described presently.

Secured to the sleeves 175 and 176 are a pair of brackets 182—182. Secured to opposed inner vertical faces of said brackets 182—182 are the carriage side plates 183 and 184. Said brackets 182—182 and said side plates are secured in fixed relationship at the two sides of the machine by means of the beam 184a (Figure 6) and the rod 184b (Figures 6 and 7). Secured to the beam 184a is the paper guide 185, which will be referred to further hereinafter.

The carriage side plates 183 and 184 extend forwardly of the brackets 182—182 and said side plates 183 and 184 near their forward extremities provide mounting means for the rocker 186 (Figures 2, 6, 7 and 14), which rocker is provided with a handle 187. The details showing the mounting of the rocker 186 within the carriage side plates 183 and 184 will be clear from the cross sectional view shown in Figure 7, from which it will be noted that the rocker 186 is internally screw-threaded at its extremities for the reception of the hollow studs 188—188. Clamped between the extremities of the rocker 186 and the heads of the studs 188—188 are the arms 189, which arms have rotatably mounted in their extremities the impression roller 190. Rigidly disposed within the hollow studs 188—188 are the pivot pins 190a—190a, which pivot pins have bearing portions rotatably disposed within the carriage side plates 183 and 184. It will be clear that when the handle 187 is oscillated, a rocking motion will be communicated to the rocker 186, which through the arms 189—189, will communicate an up and down movement to the impression roller 190. The impression roller 190 is rotatably carried in bearings which need not be described in detail. The impression roller 190 is provided for the purpose of rolling the paper into contact with the gelatine band which lies upon the bed plate. Cooperating with the impression roller 190 is the gripping roller 191, which is preferably of steel. Said gripping roller 191 is carried by a pair of hangers 192—192, which hangers are pivotally supported from the carriage side plates 183 and 184. Said hangers 192—192 are urged toward the front of the machine (Figure 6) by means of links 193—193, which links are fixedly attached to the shaft 194, which extends transversely of the carriage assembly. Said shaft 194 is biased in a clockwise direction (Figure 6) by means of a spring 195, which spring has one extremity coiled around the rod 184b and has its other extremity anchored to the shaft 194. The anchoring means for the spring 195 is illustrated in Figure 7, in which it will be noted the extremity of the spring 195 is seated within the collar 196, which is adjustably mounted upon the shaft 194, a setscrew 197 being provided for the purpose of securing said collar 196 in adjusted position. Figure 7 also shows the means for rigidly securing the links 193 upon the shaft 194, setscrews 198 being provided for securing said links 193—193 in adjusted position upon said shaft 194. From an inspection of Figure 6 it will be noted that the hangers 192—192 are provided near their lower extremities with shoulders 199. The extremities of the arms 189—189 (fixed relative to the rocker 186) are provided with teeth 200—200 adapted to engage under the shoulders 199, whereby when said rocker 186 has been rocker to a predetermined position substantially as shown in Figure 6, the hangers 192—192 will be permitted to snap a short distance in a counterclockwise direction, whereby teeth 200 will engage under shoulders 199 to lock the arms 189 and the rocker 186 in said predetermined position. Said hangers 192—192 are limited in their swing in a counterclockwise direction by the pins 201—201 disposed about midway of the length of said hangers, which pins extend through apertures 202 in the carriage side plates 183 and 184. By reason of the engagement of the pins 201 with the walls defining the apertures 202—202, the limit to which the spring 195 may urge the hangers 192—192 is fixed. As said hangers 192 stand at the limit of their counterclockwise movement, said hangers present eccentric surfaces 203—203 for engagement with the extremities of the teeth 200—200 of the arms 189—189. The eccentric surfaces 203, referred to, of hangers 192—192 have a gradually decreasing radius relative the axis of the rocker 186, whereby when the handle 187 is moved downwardly, that is, in a counterclockwise direction as the parts are viewed in Figure 6, a gradually increasing compression will be set up in the spring 195, giving a satisfactory "feel" to the handle 187. By reason of the engagement of the surfaces 203—203 of the hangers 192—192 with the teeth 200, the handle 187 will remain in any position in which it is placed, making it unnecessary to provide extra springs or catches for that purpose. The numeral 204 in Figure 6 represents an adjustable stop, one of which may be provided for each of the arms 189—189 for limiting the downward movement of said arms 189—189. It will be understood that the stops 204 will be adjusted for the thinnest paper to be used and that when thicker paper is being used the floating carriage unit will take care of such thicker paper.

According to practice which is at present preferred, the gripping roller 191 should grip the paper against the impression roller 190 at substantially the same instant that said impression roller grips the paper against the gelatine band 75. Expressed in other language, it is at present preferred to so design the parts that during the downward movement of the handle 187 the shoulder 199 on each hanger 192 will slip over the tooth 200 on each of the arms 189—189 at substantially the same instant that said arms 189—189 contact with the stops 204—204. By reason of this construction there is no lost motion in the structure involving the impression roller 190, the arms 189—189, the rocker 186 and the handle 187. The construction is rigid, having no torsional stresses adapted to throw the parts out of proper adjustment. Referring to Figure 6, the numeral 205 indicates a stop carried by the carriage side plate 184, which stop is adapted to be engaged by one of the arms 189 carrying the impression roller 190. Said stop limits clockwise movement of the handle 187 as the parts are viewed in Figure 6.

The means for releasing the locking engagement between the shoulder 199 and the tooth 200 of each hanger 192 and each arm 189, respectively, will now be described, reference being had particularly to Figures 3 and 6. Secured to the bracket 170 on the chain side of the machine is a block 206. Said block 206 is milled out for the reception of a rocking trip 207, which trip is urged into predetermined position by means of the spring 208. Said trip 207 is adapted to cooperate with the dog 209 having the tooth 210 at its extremity. Said dog 209 is secured to the shaft 194. As the carriage unit 25 is moved toward the forward end of the machine, that is—toward the right as the parts are viewed in Figure 3, the dog 209 will be moved in a counterclockwise direction by reason of the engagement of the tooth 210 thereof with the trip 207. Movement of the dog 209 in a counterclockwise direction will communicate counterclockwise rotation to the shaft 194, which will, through the links 193—193, communicate clockwise movement to the hangers 192—192. Such clockwise movement will disengage shoulders 199 from the teeth 200, whereby the operator, who has his hand upon the handle 187, may move the handle 187 forwardly, that is—in a clockwise direction as the parts are viewed in Figure 6, thereby disengaging the impression roller 190 from the paper upon the gelatine band 75. By the same action, the gripping roller 191 is disengaged from the impression roller 190 and is held out of engagement with the impression roller 190 by reason of the engagement of the teeth 200 of the arms 189 with the surfaces 203—203 of the hangers 192—192. After having been given the momentary counter-clockwise movement above referred to, the dog 209 may snap down past the trip 207, whereby the shaft 194, which carries said dog 209, is moved to the limit of its movement in a clockwise direction by the spring 195. The dog 209, by reason of its engagement with the trip 207, locks the carriage against rearward movement under the conditions referred to. After the paper which has just been operated upon has been removed and a new sheet of paper has been inserted in the carriage, the handle 187 will be moved downwardly, that is—in a counter-clockwise direction, so as to impress the new sheet of paper upon the gelatin band 75. The teeth 200 of the arms 189, by reason of their engagement with the surfaces 203—203 of the hangers 192—192, will cause said hangers to move in a clockwise direction, thereby communicating a counter-clockwise movement to the links 193—193. This counter-clockwise direction of movement will be communicated to the shaft 194, which will lift the dog 209. The parts may be so designed that said dog 209 will be released from the trip 207 practically simultaneously with the engagement of teeth 200—200 with teeth 199—199. By reason of the tolerance required in commercial manufacture it may happen that the tooth 210 of dog 209 will not quite clear the trip 207 at the instant that the teeth 200—200 are ready to register with the teeth 199. By reason of the fact, however, that the operator has his hand upon the handle 187 and is urging same in a counter-clockwise direction as the parts are viewed in Figures 3 and 6, and by reason of the fact that the tooth 210 is at this instant engaging with the trip 207 at a point relatively distant from the axis of rotation of said trip 207, the spring 208 will yield, allowing counter-clockwise rotation of said trip 207 and allowing the dog 209 to clear said trip, so that no interference will be had with the movement of the carriage to the rear, that is—toward the left as the parts are viewed in Figures 3 and 6. It will be understood, of course, that when the tooth 210 of dog 209 is fully engaged with the trip 207, the leverage tending to rotate the trip 207 will be so short that an effective locking action is had between said dog 209 and said trip 207. The dog 209 may be provided with the finger release 211, whereby the impression roller 190 may be released at any position in its range of travel.

Adjustable stop mechanism is provided for limiting the extent to which the operator may move the carriage unit toward the rear of the machine. The stop mechanism is indicated as a whole by the numeral 212. Said stop mechanism includes a pair of clamps cooperating with the rods 26 which clamps are indicated by the numerals 213—213. Each of said clamps 213 comprises a strap having a cylindrical portion 214 intermediate of its length embracing almost the entire periphery of the corresponding side rod 26. At one extremity of the cylindrical portion 214 of each clamp is the substantially straight upstanding portion 215. Said upstanding portions 215—215 of the two clamps are secured together by means of the transverse rod 216. Said upstanding portion 215 of each clamp is vertically slotted, as indicated by the numeral 217, and is provided with a semi-circular seat 218. The other extremity of the circular portion 214 is provided with the upstanding portion 219, which upstanding portion 219 is provided with the vertically disposed slot 220. Said upstanding portion 219 is bowed outwardly in an arc which is eccentric to the axis of the semi-circular seat 218 in the upstanding portion 215 of the clamp. The numeral 221 indicates an operating member having secured thereto a pin 222 adapted to rock within the seat 218. Said operating member is provided with a second pin 223 adapted to engage the eccentrically bowed surface of the upstanding portion 219. When the operating members 221—221 are in the positions illustrated in Figure 13, the clamps 213 will be in tight engagement with the side rods 26—26.

When said operating members are moved upwardly, however, the clamping effect will be relieved. Each of the operating members 221—221 has a conveniently disposed finger portion 224, whereby said clamps may be readily operated. From an inspection of Figure 3 it will be clear how the clamps 213—213 cooperate with the caps 181 secured to the sleeves 175 and 176 of the carriage unit 25. The caps 181, it will be understood, protect the bushings 177, which are preferably of soft material. In practice, it is not necessary to provide caps at the front ends of the sleeves 175 and 176 by reason of the considerable area of contact between said front ends and their abutments at the front of the machine.

The paper guide 185 and associated parts will now be described. By reference to Figure 6, it will be noted that said paper guide 185 is secured to the beam 184a, which rigidly connects together the brackets 182—182 at the two sides of the machine. The paper guide 185 includes a sheet metal member 185a, which, in a preferred embodiment, has the upstanding flange 225 at one extremity thereof. Extending rearwardly from the paper guide member 185a are a pair of flanges 226, which flanges are connected together by means of the transversely extending rod 227. The upper extremity of the paper guide member 185 is provided with the flange 228, which flange provides a guide for the adjustable slide 229. Said slide has a flat portion adapted to engage the paper guide member 185 and an upstanding flange 230 adapted to take one edge of the paper to be operated upon. Said slide 229 has portions 231—231 engaging around the flange 228 (Figures 3 and 10. Said slide 229 also has a rearwardly extending flange 232, which supports a clutching member, indicated as a whole by the numeral 233. Said clutching member comprises a pair of clutching disks 234—234 having apertures slightly greater than the diameter of the rod 227. Said clutching disks 234—234 are urged apart by the spring 235. Said clutching disks 234—234 have fingers 236—236 extending through corresponding apertures in the flange 232 of the slide 229. The mode of operation of the clutching member 233 will be clear without detailed explanation. If it is desired to move the slide 229 toward the left as the parts are viewed in Figure 10, it will be necessary only to release the right-hand clutching disk by slightly rocking same in a clockwise direction, at the same time applying a pushing movement to the slide 229. Similarly, if it is desired to move the slide 229 toward the right as the parts are viewed in Figure 10, it will be necessary only to slightly rock the left-hand clutching disk 234 by moving same in a counterclockwise direction, at the same time exerting a slight pushing force in a right-hand direction against the slide 229.

The present invention contemplates means for positively driving the impression roller 190 as the carriage assembly 27 is moved back and forth along the machine. In the illustrated embodiment of the invention a cable 237 is provided for communicating said positive driving movement to said roller 190, which cable is secured at the rear end to the block 164 on the chain side of the machine (Figures 1, 2 and 13). The connection to the block 164 is preferably made through a spring 238 (Figure 1) to permit a certain amount of give in said cable 237 and to hold same taut at all times. The other extremity of the cable 237 is secured to the bracket 170 at the front end of the machine. The intermediate portion of said cable 237 is disposed in driving relationship with a pulley 239, which pulley is fast upon the impression roller 190. By reference to Figure 7, it will be noted that said pulley 239 is mounted upon the shaft 240, which shaft extends through the adjacent carriage side plate 183. A slot 241 is provided in said side plate 183 (Figure 8), which slot permits the necessary oscillating movement to and from the gelatine band 75 of the impression roller 190. Four idler pulleys are provided for carrying the cable 237. Two of said pulleys are indicated by the numerals 242 and 243, which two pulleys are concentrically mounted with the rocker 186, being disposed upon the pin 244 (Figure 7) carried by the adjacent pivot pins 190a. The other two idler pulleys are indicated by the numerals 245 and 246 (Figure 8a). Said idler pulleys 245 and 246 are concentrically mounted upon the pin 247, which is carried by the bracket 248 secured to the adjacent carriage side plate 183. The points marking the centers of the semi-circular grooves of the pulleys 245 and 246 at the bottoms of said pulleys 245 and 246 should be in a straight line with the points of connection of the cable 237 with the block 164 at the rear of the machine and the bracket 170 at the front end of the machine, which line should be parallel with the line of travel of the carriage assembly. By reference to Figures 8 and 8a the course of the cable 237 around the pulleys immediately above referred to will be clear. That portion immediately in rear of the pulley 245 is indicated by the letter "a"; that portion of the cable extending from the pulley 245 to the pulley 242 is indicated by the letter "b"; that portion extending from the pulley 242 to the pulley 239 is indicated by the letter "c"; that portion of the cable extending from the pulley 239 to the pulley 243 is indicated by the letter "d"; that portion of the cable extending from the pulley 243 to the pulley 246 is indicated by the letter "e"; and that portion of the cable extending forwardly from the pulley 246 is indicated by the letter "f". It will be understood, of course, that instead of having the double pulleys 242 and 243 and 245 and 246, single drums could be used instead, if preferred. An advantage which accrues in a practical sense from the mounting means above referred to for the cable 237 is that very little movement is required of said cable in a direction transversely of the machine, the only transverse movement of the cable being that necessary in the portion thereof which passes around the pulleys 239, 242, 243, 245 and 246. Expressed in other language, the only transverse movement required of the cable 237 is that required in shifting from pulley 242 to pulley 243, or conversely, or from pulley 245 to pulley 246, or conversely. By reason of this fact, wear and tear upon the cable is very greatly reduced from prior practice.

An important feature of the present invention resides in the fact that the effective diameter of the pulley 239 secured to the impression roller 190 is slightly less than the diameter of said impression roller 190. Expressed in other language, the circle defining the locus of the axis of the cable upon said pulley 239 is of slightly less diameter than said impression roller 190. The effect of this difference in diameter is to drive the impression roller 190 at a slightly higher peripheral speed than the speed of translation of the carriage assembly, having the effect of ironing out the paper upon the gelatine band, obviating any tendency of the paper to wrinkle up, which tendency has been objectionable in prior practice. Moreover, the difference in speed referred to aids in stripping the paper from the gelatine band 75. As a modification of the structure referred to in this paragraph, it may be preferred to design the effective diameter of the pulley 239, not with direct reference to the diameter of the impression roller 190 but with reference to the peripheral speed which would be communicated to said impression roller 190 through its bearing traction when said roller 190 is in bearing relationship with the sheet being operated upon. Due to friction and slippage the peripheral speed which would be communicated to said roller 190 through said traction may be slightly less than the speed of translation of the carriage assembly. The present invention, therefore, contemplates a relationship of the parts such that the cable 237 positively rotates the impression roller 190 at a higher peripheral speed than the peripheral speed communicated to said roller through its bearing traction when said roller 190 is in bearing relationship with the sheet being operated upon, though the speed communicated to said roller 190 may not necessarily be greater than the speed of translation of the carriage assembly.

Features will now be described having reference to the margin at the end of the sheet of paper to be operated upon. As is well known, it is simpler in printing under the hectograph principle to leave a margin at the end of the paper being operated upon, though on numerous occasions it is essential that printing be accomplished to the very end of said sheet of paper. In practice certain definite terms are employed to describe these two methods of procedure. In case a margin is left at the end of the sheet of paper, such work is known as margin work, and in practice the minimum margin is usually about $\frac{3}{16}$ of an inch. Work which involves printing to the very end of the sheet is known as marginless work. The illustrated embodiment of the present invention provides a convenient mechanism which may be used for either margin or marginless work without the use of any accessories.

Referring particularly to Figures 2, 3, 6, 7, 9, 9a, 12 and 14, the numeral 249 indicates as a whole a margin bar unit or assembly. Said margin bar unit includes the margin bar 250, which is of novel conformation. The cross sectional conformation of said margin bar 250 is illustrated in Figure 7a and will be referred to with particularity presently. The margin bar 250 is mounted upon rods 251—251 disposed at the two sides of the machine longitudinally thereof. Said rods 251—251 are slidably and resiliently supported within a bracket 252, which bracket comprises a U-shaped member hingedly and slidably secured to the castings 168—168 at the forward extremity of the machine (Figures 3 and 7). By reference to Figure 3 it will be noted that the leg portions of the U-shaped bracket 252 are provided with slots 253, which in cooperation with pins 254 permit the hinging and sliding action referred to. The downward movement of the bracket 252 is limited by means of the lugs 255—255 (Figures 6, 7 and 12). The underside of each leg of the U-shaped bracket 252 is provided with a pair of notches, the forward notches of which are indicated by the numerals 256 and the rearward notches of which are indicated by the numerals 257. The bracket 252 can be positively located in a direction longitudinally of the machine by seating same with either the set of notches 256—256 in engagement with lugs 255 or with the set of notches 257—257 in engagement with lugs 255. The rods 251—251 are screw-threaded at their forward extremities, as indicated by the numerals 258—258, for the reception of nuts 259. Said nuts cooperate with shouldered portions 260—260 to limit forward movement of said rods 251—251, which shouldered portions are rigid with the U-shaped bracket 252. The rods 251—251 are urged rearwardly by means of the springs 261—261, which cooperate between the portions 260—260 rigid with the U-shaped bracket 252 and shouldered portions 262—262 of said rods 251—251.

Pivotally secured to the margin bar unit 249 are the movable lugs 263—263, best shown in Figure 2, and also illustrated in Figures 6 and 7. Said movable lugs 263—263 may be disposed in position transversely of the machine either outwardly or inwardly of their pivotal axes, which pivotal axes are indicated by the numerals 264—264 in Figures 2 and 7. A spring 265 may be cooperatively associated with each of the movable lugs 263—263 to resiliently hold said lugs in either of the alternative positions referred to. Said lugs 263 when they are thrown outwardly of their pivotal axes, as shown in Figure 2, are adapted to be engaged by the carriage assembly 27 when said carriage assembly is moved toward the limit of its travel in a forward direction. By reason of the engagement of the carriage assembly with the lugs 263—263, the margin bar 250 will be moved forwardly from beneath the sheet of paper which has been located upon said margin bar when the carriage assembly is moved forwardly to the limit of its travel in performing marginless work. The functions of the slidable margin bar in this connection will be referred to more in detail presently. It is preferable to move the lugs 263—263 into positions inwardly of their pivotal axes when the machine is being used for margin work. This matter will be referred to further presently.

The mechanism which is useful in producing marginless work will now be described, after which reference will be had to the manner of operating same for margin work.

Swingingly mounted upon the side rod 26 at the side opposite to the sprocket chain 81 is the bracket 266 (Figures 1, 2, 6, 7, 9 and 12). Said bracket 266 is mounted in cooperative relationship with the bracket 171 (Figures 9 and 12). It will be noted that said bracket 171 and the swinging bracket 266 are disposed upon the sleeve 267, which sleeve 267 has a collar 268 at its rearward extremity for engagement with the sleeve 176 forming part of the carriage assembly. It is by reason of the sleeve 267 and collar 268 on the one side of the machine (there being no counterpart thereof on the chain side of the machine) that the sleeve 176 is shorter than the sleeve 175. Engagement between said collar 268 and the sleeve 176 occurs, however, only in margin work, other means being provided for stopping the carriage in marginless work, which means will presently be described.

Said swinging bracket 266 is provided with a latch pin 269, which is spring pressed outwardly by means of the spring 270. A finger hold 271 permits convenient operation of the latch pin 269. When said swinging bracket 266 is moved upwardly into the position shown in Figures 1, 7 and 9 and in full lines in Figure 12 (which position is the operative position of said bracket 266 for marginless work), said latch pin 269 (Figure 9) will automatically seat itself within the recess 272 in the corresponding bracket 171, releasably holding said bracket 266 in operative position. It will be noted that the bracket 171 and sleeve 267 are held in fixed relationship with the corresponding side rod 26 by means of the setscrew 172 above referred to. When the bracket 266 is swung out of operative relationship, the latch pin 269 of said bracket will engage said setscrew 172 to limit swinging movement in a clockwise direction as the parts are viewed in Figure 12.

From an inspection of Figure 9 it will be noted that the forward edge of the swinging bracket 266 is provided with a cam surface 273. This cam surface is adapted to be engaged by a roller 274, which roller is rotatably carried by the crank arm 275 rigid with the rocker 186 of the carriage assembly (see Figures 2 and 7). Said roller 274 is coaxial with the impression roller 190. Figure 9, while omitting other parts of the carriage assembly, shows the roller 274 in engagement with the cam surface 273 and shows the crank 275, which rotatably supports said roller 274. Said Figure 9 also shows, in cross section, the adjacent pin 190a cooperatively associated with the rocker 186. It will be clear that when marginless work is being done and the carriage assembly is being moved toward the forward end of the machine, the roller 274 will engage with the cam surface 273 of the bracket 266. As the operator moves the handle 187 in a clockwise direction as the parts are shown in Figures 1, 3 and 6, the engagement of the roller 274 with said cam surface 273 will result in carrying rearwardly the carriage assembly.

From an inspection of Figure 9 it will be noted that the bracket 266 is milled out on one of its side portions, as indicated by the numeral 276. Disposed within said milled out portion is the swinging stop member 277, which is swingingly mounted upon a pin 278. Said swinging stop member 277 is limited in its counterclockwise movement, which movement is responsive to gravity, by the shoulder 279 defining one extremity of the milled out portion 276. Said swinging stop member 277 extends beyond the cam surface 273 of the swinging bracket 266 and is held at a level above the roller 274 when the impression roller 190 of the carriage unit is down in its operative impression position. When the carriage unit has completed its travel forwardly of the machine and the handle 187 is swung in a clockwise direction as the parts are viewed in Figures 1, 3 and 6 to lift the impression roller, the roller 274 will lift the swinging stop member 277. The radius of the swinging stop member 277 should be such that when the carriage assembly has been moved forward a predetermined distance by reason of the engagement of roller 274 with the cam surface 273, said roller 274 will clear said swinging stop member 277, allowing said stop member to drop by gravity into position to prevent forward movement of the roller 274, and consequently, of the carriage until the impression roller is again moved downwardly into its operative impression position.

It will be understood that if it should be preferred to operate the machine exclusively for margin work, the resilient and slidable mounting of the margin bar 250 is unnecessary. For purposes of cheapness, therefore, the margin bar 250, instead of being resiliently mounted upon the U-shaped bracket 252, may be rigidly mounted to swing about a fixed axis, for example—the axis of the pins 254 (Figure 6). Furthermore, if nothing but margin work is to be done, the swinging bracket 266 with its associated parts and the roller 274 and its crank 275 will be omitted, having the assembly with reference to the sleeves 175 and 176 and brackets 170 and 171 identical upon the two sides of the machine.

The novel construction of margin bar 250 will now be described, reference being had particularly to Figures 6 and 7A. By reference particularly to Figure 7A, it will be noted that the margin bar 250 has the upstanding wall 280 and the horizontal wall 281. The upper surface of the wall 281 is inclined relative to a horizontal plane, as indicated by the numeral 282. The upper forward extremity of said inclined surface 281 is defined by the surface 283, said surface being preferably substantially normal to the surface 282, making a right-angled corner for the reception of paper. The paper to be operated upon is indicated by the numeral 284 (Figures 7A and 14) and, as shown, is disposed between the gripping roller 191 and the impression roller 190. Said paper is seated within the corner defined by the surfaces 282 and 283 before the impression roller 191 is moved down into its operative impression position. By reason of the angular disposition of the surface 282, the formation of an abrupt corner or crimp in the paper is avoided. Exactness of registry of the printing surface is had upon successive printings regardless of the thickness of the paper being operated upon. Particularly in marginless work, wherein the margin bar 250 is moved forwardly from beneath the end of the paper 284, the avoidance of abrupt corners or crimps is desirable.

As is well known in the operation of hectograph machines, it is necessary to moisten the gelatine band. Attempts have been made to accomplish said moistening automatically, but the apparatus preferred by the present applicant contemplates manual moistening of the gelatine band. Heretofore, in the manual moistening of the gelatine band, it has been customary to provide a pair of basins or sponge cups, which have been located in more or less convenient positions adjacent to the machines, one of said basins being used for carrying a sponge and being practically empty of water and the other of said basins containing a supply of water for sponge moistening purposes. The present invention contemplates a construction involving a single sponge basin, which may be selectably located at the will of the operator in a plurality of convenient positions and which holds the sponge out of the water at all times except when the operator manipulates said sponge with a simple movement to moisten same.

Referring particularly to Figures 2, 12 and 20, reference may be had to a clamping bracket 285, which may be clamped to any convenient projection of the machine, the housing 82a at the forward end of the machine on the side opposite to the sprocket chain 81 being suitable for the purpose. Said clamping bracket is secured in position by means of the screw 286. Said clamping bracket 282 is provided with a vertical aperture 287 for the reception of the vertically disposed extremity 288 of a round rod 289. The other extremity of the rod 289 is provided with the upstanding extremity 290 adapted to fit within a corresponding aperture in a casting 291 concentrically disposed within the cup 292. The casting 291 has liquid-tight connection with the bottom of the cup 292, whereby said cup, though perforated for receiving the upstanding portion 290 of the rod 289, will hold a supply of water. Loosely fitting within the wall of the cup 292 is the perforated dished member 293 adapted to support a sponge or the like. The perforations in the member 293 are indicated by the numerals 294—294. Said dished member 293 is held upwardly by means of the spring 295, which is coaxially disposed relative to the casting 291. Said dished member 293 is provided with a downwardly extending flange 296, which flange is disposed within the coil spring 295. Upward movement of the dished member 293 is limited by the bezel ring 297, which may be secured in position by means of a bayonet catch 298, or other preferred holding means. As shown in Figure 2, the upper surface of the clamping bracket 285 adjacent to the aperture 287 is grooved, as indicated by the numerals 299, in directions disposed radially of said aperture 287. The underside of the horizontal portion of the rod 289 has a lug 300 swedged therefrom adapted to seat itself selectably at the will of the operator within one or another of said grooves 299. It will be clear that the operator may position the sponge cup 292 at any one of a plurality of positions circumferentially relative to the axis of the portion 288 of the rod 289, or, if preferred, the rod 289 and the sponge cup 292 may be removed entirely. By reason of the seating of the lug 300 within one or another of the grooves 299, the sponge cup will be positively though releasably located within any one of the positions above referred to. Under operating conditions, the cup 292 will be provided with a supply of water and a sponge will rest upon the perforated member 293. By reason of the action of the spring 295, said sponge will be held out of the water within the cup 292. When the operator desires to moisten said sponge, he need only exert a slight downward pressure upon the sponge, which will result in the compression of the spring 295, allowing the sponge to contact with the water within the cup 292. Any excess water can, of course, be squeezed out above the perforated member 293, which excess water will return to the cup 292.

By reference to Figure 13 it will be noted that the spacing between the side plates 53—53 and the side frames 22—22 permits the convenient attachment of a side table 301. Figure 2 shows, in plan view, such a side table. It will be understood, of course, that a plurality of side tables may be used simultaneously if desired. The side table 301 comprises a flat table top 302 supported by a pair of brackets 303—303. Figure 13 shows one of the brackets with the outer extremity broken away. It will be clear without detailed explanation that each of the brackets comprises a triangular structure made up of the horizontal bar 304, the vertical bar 305 and the angularly disposed bar 306. Bars 304 and 306 may be integral, if preferred. The inner extremity of bar 304 is provided with a hooked over portion 307 adapted to engage over the upper edge of the corresponding side frame 22. The vertical bar 305 is secured to the bars 304 and 306 adjacent to the extremities of said bars 304 and 306. The lower extremity of said bar 305 is inwardly turned, as indicated by the numeral 308, and is adapted to engage the outer side of the adjacent side frame 22, whereby to hold the table top 302 in substantially horizontal position. It will be clear that the structure is one which permits the ready attachment and detachment of the side table 301, it being necessary in attaching said table only to hook the portion 307 over the upper edge of one of the side frames 22 and to allow the extremity 308 of the bar 305 to contact with the side portion of said side frame 22. Detachment is accomplished in a manner which will be clear from the above description. The particular side table chosen for illustration provides means for clearing the housing 153, which houses the sprocket 81 at the side of the machine.

A novel feature of the present invention resides in improved means for securing the extremities of the gelatine band 75 to the spindles 76 and 77. By reference to Figures 13 and 14 it will be noted that each of the spindles 76 and 77 comprises a cylindrical portion having a longitudinally extending slot in its periphery. Said slot is indicated by the numeral 309. As is well known, the ordinary hectograph gelatine band has cloth secured to the extremities thereof. Said cloth ends of the gelatine band, indicated in Figure 14 by the numeral 310, are adapted to be crimped into said slots 309—309 in the spindles 76 and 77.

Said slots 309—309 have substantially parallel walls, which walls are parallel to a diameter of their corresponding spindle. Said slots have bottom walls disposed substantially at right angles to said side walls. The numeral 311 indicates a flat steel strip having slightly greater width than the width of the corresponding slot 309 or at least slightly greater than the width of said slot 309 minus the two thicknesses of said cloth 310 within said slot 309. When the extremity of the cloth end 310 of the gelatine band 75 is disposed within the slot 309, said strip 311 will be wedged into place, one edge, indicated by the numeral 312, being seated as closely as possible in one of the lower corners of the corresponding slot 309 and the opposite edge of said strip 311 being forced into jamming relationship with the cloth 310 lining the opposite wall of the slot. In order to grip efficiently the edge 312, which is first located at the bottom of the slot 309, should be on the side of said slot toward the tension side of the gelatine band 75. A strong tension between the spindle and the gelatine band will be effectually resisted by the construction referred to. If, however, it is intended to remove the extremity of the gelatine band from its spindle, such removal is rendered a simple matter by pulling upwardly on the free extremity of the cloth at the end of the gelatine band. Such action will pull the high side of the strip 311 out of the slot and free said cloth.

Though a preferred type of spindle end 78 has been illustrated and described, it must be realized that there are large numbers of gelatine bands in constant use having a different type of spindle end from that preferred herein. A common type of spindle end is illustrated in Figures 16 and 17, in which the spindle 76 is shown as being provided with a metal pin 313, which pin is nonrotatably secured in the end of the spindle coaxially therewith. Ordinarily, the spindle ends are the same on both ends. The pin 313 is oblong in cross section, as clearly shown in Figure 17. The cross sectional dimensions of said pin 313 are considerably less than the cross sectional dimensions of the spindle end 78 preferred by applicant. Consequently, a very considerable amount of space is available between said pin 313 and the inner walls of a socket 79 such as illustrated and described in the present application (see Figure 15). The present invention contemplates an adapter by means of which spindles having pins similar to the pin 313 at their extremities may be used with sockets 79 as contemplated in the present invention. Referring to Figures 16 and 17, the numeral 314 indicates a bushing or sleeve adapted to fit within the socket 79. Said bushing has an internal aperture 315 into which fits more or less loosely the pin 313. The side walls of the sleeve or adapter 315 may be provided with holding screws 316—316, which holding screws extend through free holes 317 in the corresponding side walls of the corresponding socket 79.

In case the spindles such as illustrated in Figures 16 and 17 are to be used in the socket 79, it will be a simple matter to secure the sleeve or adapter 314 within said socket 79 by means of the holding screws 316—316. With an adapter 314 in position in each of the sockets 79, the pins 313 at the extremities of the spindles will be effectually clutched. It will be understood, of course, that other types of spindle ends may be accommodated by sleeves or bushings 314 having internal apertures conforming to the particular spindle ends to be accommodated.

The functions and mode of operation of the above described embodiment of the present invention will now be described.

The stand 21, it will be noted, comprises only standard tubing which may be readily purchased in the open market and cut off to desired lengths. The side frames 22—22, the side walls 53—53, the plate 69 forming part of the bed plate, and the housing 153 comprise relatively light weight stock, involving no great expense in punching or swedging. The side rods 26 and the transverse rods for holding the two sides of the machine in spaced relationship are ordinary stock readily purchasable in the open market and requiring only the simplest type of machining for threading certain parts thereof. It will be understood that in many instances the parts may be attached together by means of a press fit, which is of course quite inexpensive. For example (Figures 11 and 12), the bushings 95 and 108 may be merely pressed into the housing plates 98 and 109, respectively.

The parts are readily separable, whereby the matter of inspection and repairs is very greatly simplified. The yoke 30 may be readily removed from the tubes 29—29 and the members 34—34 may be readily removed from the fore and aft members 33 (Figures 1 and 13) whereby the stand 21 may be readily disassembled for shipment or storage. Assembly of these parts is, of course, very easy. It will be noted from an inspection of Figure 13 that the side frames 22—22 and the parts carried thereby may be readily lifted from the studs 41—41 which form part of the stand 21. The bed plate unit 23 may be readily dismounted by loosening up on the nuts 59—59 and 59a—59a, after which said bed plate unit may be lifted from the side frames 22—22. Mounting is equally simple. The bed plate 24 merely rests within the bed plate unit 23 and may be taken off and replaced with a minimum of trouble. The level of the bed plate 24 may be readily adjusted relative to the side plates 53—53 by reason of the slots 64—64 (Figure 13) which cooperate with the side walls 61—61 of the frame 60 which supports the bed plate 24.

The sockets 79 for the reception of the spindle ends 78—78 are convenient to operate, whereby the gelatine band may be readily mounted upon the machine. By reason of the fact that the carriage unit swings about bearings at the rear of the machine, it is a simple matter to swing said carriage unit, including the rods 26—26, out of the way to permit the ready locating of the gelatine band 75 across the bed plate 24. By reason of the novel operating mechanism for the spindles, it is convenient for the operator to wind the gelatine band either toward the rear of the machine or toward the front of the machine. The operator may put in a new spindle at either the front or the rear, whichever suits his convenience better, and by simple manipulation of the hand wheel 80 may apply a positive winding movement to either the spindle at the front of the machine or the spindle at the rear of the machine, as he desires. This advantage of positively winding the gelatine band in either direction at will is a decidedly practical one, as will be clear from the following example. Let it be assumed that a master copy has been impressed upon the gelatine band and a number of copies have been made from the impression, after which the gelatine band is moved and another master copy is impressed upon the gelatine band at another section of said gelatine band. If more copies of the impression first mentioned are desired, it is a very simple matter for the operator to turn back to the impression first mentioned to make the added copies desired, provided, of course, an unreasonably long time has not elapsed since the first impression was made.

The functions of the winding mechanism, whereby the operator may with a single hand wheel selectably wind the gelatine band in either direction, will be clear without detailed explanation. It may be briefly recited, however, that when the operator desires to move the band he will restrain the hand wheel 80 temporarily with his finger or thumb, and with his thumb or finger will flip the handle arm 120 in the direction in which he intends to turn said hand wheel 80. For example, referring to Figures 1 and 4, if the operator desires to move the hand wheel 80 in a clockwise direction to move the gelatine band toward the front of the machine, he will, while momentarily restraining the hand wheel 80, flip the handle arm 120 in a clockwise direction. Turning of the handle 121 in clockwise direction will result, when a fraction of a revolution has been accomplished, in the engagement of the dog 128 in one of the notches 129, positively moving said hand wheel 80 and shaft 93 in a clockwise direction. By reference to Figure 12 it will be noted that the shaft 93 is directly connected to the socket 79, which is clutched to the spindle at the forward end of the machine. Under these conditions, therefore, clockwise rotation of the hand wheel 80 will positively drive the spindle at the forward end of the machine to move the gelatine band toward the forward end of the machine. If on the other hand the operator desires to move the gelatine band toward the rear of the machine, he will momentarily restrain the hand wheel 80 and flip the handle arm 120 (Figures 1 and 4) in a counter-clockwise direction. This will move the dog 127 into position to contact with one or the other of recesses 130 in the clutch member 116. Said clutch member is directly connected through the sprocket 115, sprocket chain 81 and sprocket 106 to the rear spindle. Therefore, counterclockwise rotation of the hand wheel 80 will communicate positive driving movement to the rear spindle to move the gelatine band toward the rear of the machine. The gelatine band 75 will be held against accidental movement by reason of the dogs 105 and 119 (Figure 3). It will be understood, of course, that said dogs will be thrown out of engagement with their corresponding ratchet wheels 104 and 118 before turning movement is communicated to the hand wheel 80. Movement of said dogs 105 and 119 is accomplished by manipulation of the cam plate 146, the action of which need not be described in detail inasmuch as said cam plate has been fully described above. After the gelatine band has been located in the position desired by the operator, said cam plate 146 may be flipped to allow the dogs 105 and 119 to cooperate with their corresponding ratchet wheels 104 and 118 (Figure 3). Thereafter the operator may make the gelatine band taut by turning up upon the hand wheel in one direction or the other, as he prefers, the handle arm 120 having been flipped in the direction in which he desires to turn the hand wheel 80. By reason of the fact that the action in making the gelatine band taut may be accomplished by operation of the spindle at either end of the machine, the matter of locating any particular portion of the band at any region of the bed plate is greatly simplified.

It will be understood without detailed explanation how the carriage unit 25, which includes the side rods 26—26, floats in action whereby to produce a uniform pressure throughout the paper being operated upon regardless of the dimensions of said paper. By reason of the floating features of the carriage unit 25 a substantially uniform pressure is had transversely of the paper, whether said paper be the full width of the bed plate or of less width, and in the latter case whether said paper is located adjacent to one side of said bed plate near the center thereof or adjacent to the other side of said bed plate. By reason, further, of the floating features of the carriage unit 25, a uniform pressure is had upon the paper being operated upon regardless of the length and thickness of said paper. This will be understood if it be considered that a relatively heavy gauge card is being printed. When the carriage assembly 27 operates upon said heavy gauge card at the forward extremity of the machine, the pivot blocks 164—164 will be at the lowermost portions of their slots and the forward portion of the carriage unit will be lifted, whereby the horizontal portions 174a—174a of the brackets 170 and 171 are lifted clear of their corresponding side plates 53—53. As the carriage assembly 27 is moved toward the rear of the machine, the weight of the carriage unit 25 exerts a substantially uniform pressure upon said card. When said carriage assembly 27 is moved sufficiently far back so that the center of mass of the carriage unit 25 is disposed substantially equi-spaced from the rear pivotal axis of said carriage unit and the front support of said carriage unit, said carriage unit will be balanced. As said carriage assembly 27 is moved further toward the rear of the machine, the pivot blocks 164—164 at the rear of the machine will be raised from the bottom of their slots, swinging about the effective axis of the bearing contact between the brackets 170 and 171 with the side plates 53—53. The bearing effect of the carriage unit will, therefore, be substantially uniform throughout the entire range of travel of the carriage assembly 27.

The cable 237 (Figures 1, 6 and 7) has the function of positively driving the impression roller 190 when the carriage assembly 27 is being moved backward or forward along the bed plate. As explained above, the effective diameter of the pulley 239 fast to the impression roller 190 is of slightly less diameter than said impression roller 190, whereby said cable tends to drive said impression roller 190 at a slightly higher peripheral speed than the speed of translation of the carriage. As explained above, this has the action of ironing out the paper, preventing the wrinkling thereof and also facilitating the stripping of the paper from the gelatine band after printing has been accomplished. The gripping roller 191, by keeping the paper in contact with the impression roller 190, facilitates the stripping action referred to. As is clearly shown in the drawings (particularly Figures 1, 7, 8 and 8a), the cable 237 is maintained for the major portion of its length in a straight line at all times, the only variation from said straight line being that caused by passage over the idler pulleys 242, 243, 245 and 246. Destructive stresses upon said cable are therefore minimized.

Movement of the carriage assembly 27 is limited toward the rearward end of the machine by means of the stop mechanism which is indicated as a whole by the numeral 212 (Figures 1, 3, 13 and 14). As will be clear from the drawing and the description appearing above, the stop mechanism 212 is maintained at all times in proper adjustment by reason of the rod 216, which extends transversely of the machine, and the clamps 213—213, which embrace the fixed side rods 26—26. The stop mechanism 212 may be conveniently adjusted by operation of the finger portions 224—224. When said finger portions are moved to releasing position, it is a simple matter to move the stop rearwardly by shoving against same with the carriage assembly 27. It is equally simple to move the stop mechanism toward the forward end of the machine by exerting pressure upon the two clamps 213—213. When the stop mechanism is in the desired position, the finger portions 224—224 will be turned downwardly to secure the clamps 213—213 in gripping relationship with the side rods 26. Said clamps 213—213 form effective and rigid stops for the carriage assembly.

The paper guide feature of the carriage assembly is very convenient in use. The paper guide is indicated by the numeral 185 (Figures 2, 3, 6, 10 and 14). The left-hand edge of the paper being operated upon may be conveniently located by means of the slide 229, which slide has the upstanding flange 230 adapted to take the left-hand edge of the paper to be operated upon, looking from the front of the machine. As fully explained above, it is a simple matter to move the slide either to the right or left as the parts are viewed from the end of the machine (see Figure 10) by exerting a slight rocking movement to the clutching disk 234 disposed oppositely to the direction in which the slide is to be moved and exerting a slight pressure against said slide. At all other times the clutching members 234—234 will hold said slide 229 in fixed position.

The functions of the means for locating the paper for either margin or marginless work will now be described. When it is desired to print to the very end of the paper to be operated upon (that is, marginless work), the margin bar unit 249 (Figures 2, 3, 6, 7, 9, 12 and 14) is located as far rearward as possible; that is to say, referring particularly to Figure 6, the notches 257—257 in the under side of the U-shaped bracket 252 are positioned to receive the lugs 255—255. Expressed in other language, the pins 254—254 (Figures 3 and 6) are located in the forward extremities of the slots 253—253 in the U-shaped bracket 252. Under these circumstances, that is—for marginless work, the lugs 263—263 (Figure 2) are disposed outwardly of their pivotal axes. At this time also the swinging bracket 266 (Figures 1, 2, 6, 7, 9, 9a and 12)

is swung upwardly into operative position. The operator (assuming that the master copy has not yet been inserted into the carriage assembly) will move the carriage assembly toward the forward extremity of the machine, and the roller 274, rotatably carried by the crank arm 275, will engage the cam surface 273 of the swinging bracket 266 at the upper extremity of said cam surface 273, substantially in the position illustrated in Figure 9a. In this position the swinging lugs 263—263 are in contact with the carriage side plates 183 and 184. As explained above, the crank arm 275 is fixedly disposed relative to the rocker 186 which carries the handle 187, and the roller 274 is coaxially mounted relative to the impression roller 190. The operator will locate the slide 229 at the desired position transversely of the machine and will insert his master copy with the left-hand edge thereof disposed within the corner defined by the upstanding flange 230 of said slide 229. The paper to be operated upon, which is indicated by the numeral 284 in Figure 14, is disposed between the gripping roller 191 and the impression roller 190, and the forward edge of said paper is located within the corner defined by the angularly placed walls 282 and 283 of the margin bar 250 (Figure 7a). At this time the impression roller 190 is up out of contact with the paper 284, and no gripping relation between the gripping roller 191 and the impression roller 190 is being exerted. Accurate positioning of the paper is a very simple matter. The operator, having positioned his paper relative to the slide 229 and the margin bar 250, will swing the handle 187 in a counter-clockwise direction as the parts are viewed in Figures 3 and 6. By reference to Figure 9a it will be noted that the swinging stop member 277, which is in engagement with the roller 274, prevents movement of the carriage assembly 27 in a forward direction at this time. The impression roller 190 is then moved downwardly, by manipulation of the handle 187, to grip the paper against the gelatine band. By reference to Figure 6 it will be noted that the teeth 200, by reason of engagement with the cam surfaces 203 of the hangers 192, will move said hangers 192 in a clockwise direction against the action of the spring 195 until said teeth 200 clear the shoulders 199, after which said shoulders 199 will be urged through the action of the spring 195, links 193 and hangers 192, into locking engagement with the teeth 200. This locking engagement will occur at the same instant that the impression roller 190 is moved into contact with the paper 284, which paper is disposed upon the gelatine band 75. Expressed in other language, said locking engagement will occur at substantially the same instant that the arms 189—189 secured to the rocker 186 and handle 187 (Figure 6) engage the adjustable stops 204—204. When the handle 187 has been moved down a sufficient distance for the roller 274 to clear the lower extremity of the swinging stop member 277, the operator will pull forward upon the carriage assembly 27, causing the carriage side plates 183 and 184 to exert pressure against the lugs 263 and moving the margin bar 250 in a forward direction against the tension of the springs 261—261 (Figure 7). The position of the roller 274 clearing the stop member 277 is shown in Figure 9. This action moves the margin bar forwardly from underneath the edge of the paper 284 and permits the impression roller 190 to roll said paper 284 into tight contact with the gelatine band 175 up to the very forward edge of said paper 284. Expressed in other language, the axis of the impression roller 190 is moved to a position vertically disposed above the forward edge of the paper 284. As mentioned above, the paper being operated upon at this time is the master copy. After having rolled the forward edge portion of the master copy into contact with the gelatine band 75, the operator will push rearwardly upon the handle 187 to move the carriage toward the rear of the machine a sufficient distance to impress the printing of the master copy upon said gelatine band, which action may or may not require the carriage assembly to be run so far as to withdraw the impression roller 190 and gripping roller 191 from gripping engagement with said master copy, depending upon the margin at the rear end of said master copy. According to usual practice, the operator will allow the master copy to remain upon the gelatine band for a few seconds, after which he will move the carriage assembly back to the forward end of the machine. It may be preferred in practice to rub the forward margin of the master copy into contact with the gelatine band 75 by hand instead of by means of the impression roller 190. If this hand operation is preferred, the carriage assembly will not be moved forwardly (in impressing the master copy upon the gelatine band) beyond the starting point, i. e. the point at which the impression roller is moved into locked engagement with the paper, as described above. Then instead of moving the carriage assembly forwardly to move the margin bar 250 from beneath the margin of the paper and to roll said margin of said paper into contact with the gelatine band 75 (as described above) the operator will move the carriage assembly rearwardly to impress the remainder of said master copy upon said gelatine band, and, during the few seconds interval, above mentioned, the operator will retract the margin bar by hand and will, with a movement of his fingers rub the forward margin of said master copy down upon said gelatine band after which said margin bar 250 will be allowed to move rearwardly into overlapping relationship with the forward margin of the master copy.

When the operator has moved the carriage assembly back to the forward end of the machine, the carriage side plates 183 and 184 will again engage the swinging lugs 263—263 (Figures 2 and 7). At this time the dog 209 will ride up over the trip 207, raising the rotating shaft 194 in a counterclockwise direction (Figures 3 and 6), rotating the arms 193—193 in the same direction, and retracting the cooperating hangers 192—192, that is—moving said hangers in a clockwise direction as the parts are viewed in Figure 6. Retraction of the hangers 192—192 will release the shoulders 199—199 from the teeth 200—200, allowing the operator to move the handle 187 in a clockwise direction (Figure 6), releasing the impression roller 190 from the paper. The master copy may then be lifted out of the carriage, if said master copy had not been run out of the carriage in the rearward movement thereof. By reference to Figure 9 it will be noted that rotation of the pivot pin 190a (which is fast with the rocker 186) will result in the lifting of the crank 275 and roller 274. Inasmuch as at this time the roller 274 is located beneath the swinging stop member 277, a result of lifting the impression roller will be to lift the stop member 277 until said roller 274 is at the upper limit of its movement, as shown in Figure 9a, at which time said stop member 277 will clear said roller 274 and drop by gravity to the position shown in Figures 9 and 9a. In the same movement, the carriage assembly 27 will be moved rearwardly by reason of the camming action of the cam surface 273 against said roller 274, causing movement of the carriage assembly 27 rearwardly to its starting point. When the roller 274 is at the upper limit of its movement, it will clear the swinging stop member 277, allowing said stop member 277 to drop by gravity into the position shown in Figures 9 and 9a. Said swinging stop member 277 will now be in a position to prevent further forward movement of the carriage assembly 27. The action referred to has advantages in a practical sense, inasmuch as it automatically locates the carriage assembly for the beginning of every successive operation in such a position that the impression roller 190, when it is pressed down upon a sheet of paper, will grip said sheet of paper a short distance in rear of its forward edge, allowing the forward edge of said paper to be located with certainty upon the margin bar 250. By reason of the construction referred to, precision in locating the paper is furthered.

The impression has now been made upon the gelatine band 75 and copies may be accurately and expeditiously made therefrom.

Briefly stating the mode of operation of running the copies, it may be assumed that the carriage is at the starting position adjacent to the forward end of the machine with roller 274 (which is coaxial with the impression roller 190) up against the camming surface 273 of the swinging bracket 266 and also in engagement with the swinging stop member 277. With the parts in these positions, the paper is inserted up against the slide 229 with the forward edge of said paper located upon the margin bar 250. The impression roller 190 is then moved downwardly by manipulation of the handle 187 to grip the paper against the gelatine band. By reference to Figure 6 it will be noted that the teeth 200, by reason of engagement with the cam surfaces 203 of the hangers 192, will move said hangers 192 in a clockwise direction against the action of the spring 195, giving a satisfactory "feel" to the handle 187, until said teeth 200 clear the shoulders 199, after which said shoulders 199 will be urged, through the action of the spring 195, links 193 and hangers 192, into locking engagement with the teeth 200. This locking engagement will occur at the same instant that the impression roller 190 is moved into contact with the paper 284, which paper is disposed upon the gelatine band 75. At this time the roller 274 clears the swinging stop member 227 and the operator may pull forwardly upon the carriage assembly 27, the carriage side plates 183 and 184 pushing against the swinging lugs 263 and pushing the margin bar 250 against the action of the springs 261 (Figure 7) out from beneath the paper 284. The operator may move the carriage assembly to a position in which sleeve 175 contacts with the bracket 170 and sleeve 176 contacts with the collar 268 at which time the axis of the impression roller 190 is directly above the forward edge of the paper 284. The operator then moves the carriage assembly toward the rear of the machine to roll the paper upon the gelatine band. For rapid work, it will be preferred usually to set the stop unit 212 in position to limit the travel of the carriage assembly toward the rear of the machine at a predetermined position. Said stop unit 212 will be used, as a general proposition, only when a considerable number of copies are to be made from one impression on the gelatine band 75. As the carriage assembly is returned toward the forward end of the machine, the impression roller 190, in cooperation with the gripping roller 191, strips the paper from the gelatine band. When the carriage assembly is moved past its starting point near the limit of its travel in a forward direction, the carriage side plates 183 and 184 again engage the swinging lugs 263—263 to move the margin bar 250 out of the way. The dog 209 engages the trip 207 to swing the shaft 194 (Figures 3 and 6). Swinging of the shaft 194 causes the retraction of the hangers 192—192, releasing the shoulders 199 from the teeth 200, whereby the operator may swing the impression roller 190 up out of contact with the paper to permit the removal of the paper. The action of lifting the impression roller, by reason of engagement of roller 274 with the cam surface 273 (Figures 9 and 9a), brings the carriage back to its starting point.

When work is being done which does not require printing to the very end of the paper, that is to say, when margin work is being done, the swinging lugs 263 (Figures 2 and 7) are moved inwardly of their pivotal axes and the margin bar unit 249 is moved forwardly to a position in which the notches 256—256 thereof take over the lugs 255—255 (Figures 6 and 14). Moreover, the swinging bracket 266 is unlatched and allowed to swing out of operative position.

The parts are now set for margin work. The master copy will be impressed upon the gelatine band by locating same upon the paper guide 185 with one edge thereof in engagement with the slide 229. The forward edge of said master copy will be located upon the margin bar 250. The arrangement of the parts for margin work is illustrated in Figure 14. For margin work, the master copy for making the impression upon the gelatine band 75 will be disposed within the carriage assembly 27 when said carriage assembly is at the forward end of the machine. As will be clear from the discussion of the mode of operation appearing above applying to marginless work, the impression roller 190 will be in its uppermost position free of the gripping roller 191 whereby the operator may insert the paper 284 (which in this instance is the master copy) between said gripping roller 191 and impression roller 190, locating said paper 284 by means of the slide 229 upon the paper guide 185. The forward edge of said paper 284 will be located upon the margin bar 250. At this time the sleeve 175 will be in abutting relationship with the bracket 170 upon the chain side of the machine, and the sleeve 176 will be in abutting relationship with the collar 268 which forms the rearward extremity of the sleeve 267 on the side opposite to the chain side of the machine.

It will be noted that the carriage side plates 183 and 184 are free of the swinging lugs 263—263 by reason of the fact that said lugs 263 have been swung inwardly from their axes of rotation. With the paper 284 located as above described, the operator will swing the handle 187 in a counterclockwise direction, as the parts are viewed in Figures 3 and 6, moving the impression roller 190 down toward the gelatine band 75. As will be clear from the discussion above in connection with marginless work, the teeth 200—200 upon the arms 189—189 which are rigidly connected to the handle 187 will move the hangers 192—192 rearwardly urging same in opposition to the spring 195. At the instant that the impression roller 190 is in gripping contact with the paper upon the gelatine band 75, the shoulders 199—199 will snap into engaging relationship with the teeth 200—200 allowing the gripping roller 191 to firmly grip the paper against the impression roller 190. As shown in Figure 14, said impression roller 190 will contact with the paper 284 immediately in rear of the margin bar 250. With the parts in the relations referred to, the operator will move the carriage assembly 27 toward the rear of the machine, making an impression from the master copy upon the gelatine band. After the necessary interval of time, which amounts to a few seconds, to allow a sufficient transfer from the master sheet to the gelatine band, the operator will return the carriage assembly to the forward end of the machine. The dog 209 will engage the trip 207 causing said dog 209 to have a movement in a counterclockwise direction, as the parts are viewed in Figures 3 and 6. Such movement of the dog 209 will communicate a counterclockwise movement to the shaft 194 which, as will be clear from Figure 6, causes the retraction of the hangers 192—192 to release the shoulders 199—199 from the teeth 200—200, enabling the operator to swing the handle 187 in a clockwise direction, as the parts are viewed in Figures 3 and 6, to raise the impression roller from the paper. By reason of the fact that the teeth 200—200 engage the cam surfaces 203—203 of the hangers 192—192, the gripping roller 191 is held out of gripping relationship with the impression roller 190. When the impression roller 190 is freed from the paper 284 and the gripping roller 191, the operator may lift the master copy from the carriage.

It will be clear from the description hereinbefore appearing, and from an inspection of Figures 3 and 8, that forward movement of the hangers 192—192 is limited by engagement of the pins 201—201 with the boundary of the holes 202—202 in the carriage side plates 183 and 184. Swinging movement of the handle 187 in a counterclockwise direction, as the parts are viewed in Figures 3 and 6, is limited by the stop 205 which is engaged by one of the arms 189.

The impression from the master copy is now made upon the gelatine band and a large number of copies may be run from said impression. The operation of making copies is substantially the same as that described above in connection with impressing the master copy upon the gelatine band, except of course, that no delay is necessary between the completion of the rearward travel of the carriage assembly and the beginning of the forward travel of said carriage assembly.

By reason of the novel conformation of the housing plates 98, 99, 109 and 110, the wastage of material is reduced to a minimum. Said housing plates are identical in outline, the outline being illustrated in Figure 3a, which outline is exactly the same as the outline of the apertures 83—83 in said frames 22—22, (Figure 11). There are four of said apertures 83 in the two side frames 22—22. The material from said four apertures comprises the four housing plates 98, 99, 109 and 110 above referred to. By disposing the wings 155—155 of said housing plates in registry with the complementary inwardly projecting wings 156 bounding the apertures 83—83 in the said frames 22—22, said housing plates are rigidly secured to said side frames 22—22, (see Figure 3).

Attention is directed to the fact that when the impression roller 190 is in its upper position (Figure 14a) out of contact with the paper 284 and with the gripping roller 191, said impression roller is freely accessible for cleaning. It will be clear, without detailed explanation, that when it is desired to clean the impression roller 190 a cloth, moistened or not as preferred with some cleaning fluid, will be held in contact with said impression roller 190 while the carriage assembly 27 is moved back and forth throughout a small region of the travel of said carriage assembly. By reason of this movement the cable 237 will positively rotate the impression roller 190 whereby all portions of the periphery of said roller will come in contact with the cleaning cloth.

By reason of the fact that the carriage unit, including the carriage assembly 25 and the side rods 26—26, is rotatably mounted in the pivot blocks 164—164, ready access is had to the bed plate 24. This simplified the matter of mounting the gelatine band within the machine and dismounting said gelatine band. It will be clear that the operator may mount the spindle in the center of a gelatine band within the socket 79 at either the forward or rear end of the machine, as he prefers. The sockets at the side of the machine opposite the chain side, are resiliently mounted making the insertion of the spindle a very simple matter. After the center spindle has been mounted in place, the spindle at the other end of the gelatine band may be moved along the bed plate 24, it being necessary only to lift the forward end of the carriage unit a slight amount to permit the passage of said spindle. The spindle at the free end of the gelatine band may be inserted within the sockets 79—79 at the other end of the machine with a simple movement, it being necessary only to move one of the sockets 79 a short distance transversely of the machine against its spring 85.

Said side rods 26—26 are spaced apart a greater distance than the width of the table 32 at the top of the machine (Figures 1 and 2) whereby said side rods 26—26 with the carriage assembly thereon may be swung upwardly through an angle of more than 90 degrees. The travel of the carriage unit 27 including the rods 26—26 may be limited by any proper means, the yoke 30 being suitable for this purpose. It will be understood that the stop unit 212 holds the carriage assembly 27 at any point along the rods 26—26 at the choice of the operator. By moving the entire carriage unit, including the rods 26—26, up out of the way, free access may be had to the bed plate unit 23, including the bed plate 24. This action permits the ready adjustment of the bed plate unit 23, as well as the ready assembly and disassembly of the bed plate 24. As mentioned above, when a change is made from an opaque bed plate to a transparent bed plate or vice versa it is necessary to change the setting of the bed plate frame 60 inasmuch as the transparent bed plate will ordinarily be of greater thickness than the opaque bed plate. This change in setting is easily accomplished as above described. The thresholds 67—67 provide smooth end portions for the bed plate 24 whereby abrupt bends or crimps of the gelatine band are avoided. As pointed out above, the elevation of the portions 68—68 of the thresholds 67—67 relative to the horizontal portions 62 of the bed plate frame 60 may be controlled by the use of shims.

Though the above description of a preferred embodiment of the present invention has gone into considerable detail, it will be clear that many modifications will occur to those skilled in the art. It is intended to cover all such modifications that fall within the scope of the appended claims.

I claim:

1. In a hectograph machine, in combination, a stand including fore and aft members, a body member supported by said stand, studs, carried by said fore and aft members, eye portions secured to said body member, said studs being disposed within said eye portions, each of said studs comprising a pair of clamping members, securing means for holding together the clamping members of each of said studs on its underside, and a washer for securing together said clamping members of each stud upon its upper side, said eye portions of said body member being carried by said washers.

2. In a hectograph machine, in combination, a stand including fore and aft members, a body member supported by said stand, studs carried by said fore and aft members, eye portions secured to said body member, said studs disposed within said eye portions, each of said studs comprising a pair of clamping members, securing means for holding together the clamping members of each of said studs on its under side, and a washer for securing together said clamping members of each stud upon its upper side, said eye portions of said body member being carried by said washers, certain of said studs being provided with apertures above said eye portions and locking means disposed within said apertures.

3. In a hectograph machine, in combination, a member to be supported, feet secured to said member said feet including eye portions, supporting means for said feet, upstanding studs carried by said supporting means, each of said studs including a pair of clamping members, means associated with each of said studs for holding together said clamping members at the lower extremities thereof, and a washer associated with each of said studs for holding together said clamping members above the clamping portions thereof, said studs extending through said eye portions.

4. In a hectograph machine, in combination, relatively flat side frames, feet secured to said side frames, said feet having apertures therein, which apertures have vertical axes, supporting studs for said feet, bars carrying said studs, each of said studs including a pair of clamping members having clamping relationship with their corresponding bars, said clamping members below said bars being rigidly secured together, and washers encircling said studs above said bars, said studs extending through said apertures.

5. In a hectograph machine, in combination, a stand comprising forward uprights, rear uprights, forward and aft members connecting said forward and rear uprights, cross members for bracing said uprights and fore and aft members, said rear uprights comprising tubes, a yoke member having its extremities slidable within said tubes, a table carried by said yoke member, and a swinging carriage unit hingedly mounted adjacent the said yoke, said carriage unit being adapted to straddle said table, said yoke comprising a limiting means for said carriage unit.

6. In a hectograph machine, in combination, a supporting stand including fore and aft members, upstanding studs carried by said fore and aft members, said studs comprising clamping members having clamping relationship with said fore and aft members, frame members having apertured portions adapted to seat themselves upon said studs, said studs extending through said apertured portions.

7. In a hectograph machine, in combination, a stand provided with upstanding studs, frame members having apertured feet adapted to seat themselves in encircling relationship with said studs, a bed plate unit carried by said frame members, a bed plate frame adjustably carried by said unit, and a bed plate resting upon said frame and nesting within said unit.

8. In a hectograph machine, in combination, side frames, means for holding same in fixed spaced relationship with one another, certain of said means comprising cross rods, a bed plate unit having open ended slots on the underside thereof adapted to receive said cross rods whereby the bed plate unit may be readily assembled and disassembled relative to said side frames, a bed plate frame adjustably carried by said unit, and a bed plate lying upon said frame and nesting within said unit.

9. In a hectograph machine, in combination, a bed plate unit comprising a pair of side plates, a bed plate frame adjustably carried by said side plates thresholds disposed at the two ends of said bed plate unit, a bed plate disposed within said thresholds, said bed plate nesting between said side plates.

10. In a hectograph machine, in combination, a pair of side plates, means for holding same in fixed spaced relationship with one another, a bed plate frame carried by said side plates, said frame and side plates having a vertical adjustment relative to one another, said frame comprising a rectangular member each of the sides of which has the cross-sectional contour of a Z-bar presenting upper edges in a single horizontal plane, a bed plate upon said upper edges, and thresholds carried by said bed plate frame limiting movement of said bed plate forwardly and rearwardly of said frame.

11. In a hectograph machine, in combination, a pair of side plates, means for holding same in fixed spaced relationship with one another, a bed plate frame carried by said side plates, said frame and side plates having a vertical adjustment relative to one another, said frame comprising a rectangular member each of the sides of which has the cross-sectional contour of a Z-bar presenting upper edges in a single horizontal plane, a bed plate upon said upper edges, and thresholds carried by said bed plate frame limiting movement of said bed plate forwardly and rearwardly of said frame, said bed plate nesting between said side plates.

12. In a hectograph machine, in combination, a pair of side plates, means for holding same in fixed spaced relationship with one another, a bed plate frame carried by said side plates, said frame and side plates having a vertical adjustment relative to one another, said frame comprising a rectangular member each of the sides of which has the cross-sectional contour of a Z-bar presenting upper edges in a single horizontal plane, a bed plate upon said upper edges, and thresholds carried by said bed plate frame limiting movement of said bed plate forwardly and rearwardly of said frame, said side frame members having horizontal webs, said thresholds having flat portions carried by said horizontally disposed webs.

13. In a hectograph machine, in combination, a bed plate unit comprising a pair of side plates, means for securing same in fixed spaced relationship with one another, a bed plate frame adjustably carried by said side plates, said frame comprising a rectangular member each side of which has the contour of a Z-bar providing upper edges disposed in a single horizontal plane and providing recesses disposed outwardly of said edges, a bed plate carried by said frame, said bed plate having a flexible cover, securing means disposed along the edges of said bed plate on the under side thereof for holding said cover taut, said securing means being disposed within said recesses.

14. In a hectograph machine, in combination, a bed plate unit comprising side plates, a bed plate frame adjustably carried by said side plates, thresholds carried by said frame, and a bed plate carried by said frame, said bed plate nesting between said thresholds and said side plates.

15. In a hectograph machine, in combination, side plates, a bed plate frame adjustably carried thereby, said frame being provided with recesses at its forward and rear ends, thresholds having portions disposed within said recesses, each of said thresholds comprising a flat portion and a rounded head portion.

16. In a hectograph machine, in combination, a bed plate frame having portions providing bearing surfaces disposed in a horizontal plane, a bed plate carried by said bearing surfaces, said portions also providing other bearing surfaces disposed in another horizontal plane spaced below said first mentioned horizontal plane, a pair of thresholds each comprising a rounded head and a leg portion, the leg portions of said thresholds being carried by said second mentioned surfaces of said frame.

17. In combination, in a hectograph machine, side plates, a bed plate, and a carriage unit having portions adapted to have bearing relationship with said bed plate, said carriage unit including a pair of rods, and means including floating bearings for swingingly supporting said rods adjacent to one end of said side plates.

18. In combination, in a hectograph machine, side plates, a bed plate, and a carriage unit having portions adapted to have bearing relationship with said bed plate, said carriage unit including a pair of rods, and means including floating bearings for swingingly supporting said rods adjacent to one end of said side plates, said rods being disposed outwardly of the boundaries of said side plates.

19. In a hectograph machine, in combination, a pair of side plates, means for holding same in fixed spaced relationship with one another, a bed plate, said side plates being provided with aligned slots the axes of which are in substantially right angular relationship with said bed plate, hinging means slidably mounted within said slots, and a carriage unit swingingly carried by said hinging means.

20. In a hectograph machine, in combination, a pair of side plates, means for holding same in fixed spaced relationship with one another, a bed plate, said side plates being provided with aligned slots the axes of which are in substantially right angular relationship with said bed plate, hinging means slidably mounted within said slots, and a carriage unit swingingly carried by said hinging means, said carriage unit including rods and a carriage assembly slidable along said rods in bearing relationship with said rods.

21. In a hectograph machine, in combination, side plates, a bed plate carried thereby, a carriage unit adapted to cooperate with said bed plate and floating bearings cooperating with said side plates for swingingly mounting said carriage unit.

22. In a hectograph machine, in combination, a bed plate unit including a bed plate, floating bearings carried by said unit, a pair of rods swingingly secured to said bearings near one extremity of said bed plate unit, means extending transversely of said unit for securing said rods together adjacent to their swinging extremities, and a carriage assembly slidably carried by said rods adapted to cooperate with said bed plate.

23. In a hectograph machine, in combination, a carriage unit including a pair of parallel rods, a carriage assembly slidably mounted upon said rods, a stop unit slidably mounted upon said rods, said stop unit comprising a pair of clamps mounted upon said rods, and a cross bar for maintaining said clamps in alignment transversely of said machine.

24. In combination, in a hectograph machine, a carriage unit including a pair of parallel rods and a carriage assembly slidably mounted upon said rods, a stop unit slidably carried by said rods, said stop unit including a pair of clamps each adapted to have gripping relationship with one of said rods, each of said clamps including a cam portion, and holding members cooperating with said cam portions for controlling the gripping action of said clamps.

25. In combination, in a hectograph machine, a carriage unit including a pair of parallel rods, a carriage assembly mounted upon said rods, and a stop unit mounted upon said rods, said stop unit including a pair of clamps, a transverse rod for maintaining said clamps in alignment transversely of said machine, each of said clamps comprising a strap encircling one of said rods, the extremities of each of said clamps being slotted, one of said extremities of each clamp being provided with a camming portion and a holding member disposed in said slotted extremities of each clamp having abutting means cooperating with one of said extremities and with said camming portion of the other of said extremities.

26. In a hectograph machine, in combination, a bed plate unit, a carriage assembly, means cooperatively associated with said bed plate unit for guiding said carriage assembly for movement along said bed plate unit, said carriage assembly including an impression roller, mounting means for said impression roller for moving same to and from said bed plate unit, cable means for driving said impression roller, the driving relationship between said cable and said roller being such as to positively drive said roller at a higher peripheral speed than the speed of translation of said carriage assembly.

27. The method of applying a sheet of flexible paper or the like to a hectograph band which consists in rolling said sheet upon said band, moving the axis of the rolling action with a movement of translation along said band and positively rotating the rolling means at a higher peripheral speed than the speed of said motion of translation.

28. The method of operating a roller for applying a sheet of paper or the like to a hectograph band, which consists in communicating a positive movement of translation to the axis of said roller along said band and at the same time positively communicating a movement of rotation to said roller at a peripheral speed greater than the speed of said movement of translation.

29. In a hectograph machine, in combination, a bed plate unit, a carriage assembly slidable along said unit, an impression roller carried by said assembly, said impression roller being adapted to be moved toward and away from said bed plate unit, a cable having its extremities fixed relative to the plane of movement of said carriage assembly, a pulley cooperatively connected with said cable and with said impression roller, the relation of the effective diameter of said pulley and the diameter of said impression roller being so correlated that when said carriage assembly is moved along said bed plate said cable drives said impression roller at a higher peripheral speed than the speed of translation of said carriage assembly.

30. In combination, in a hectograph machine, a bed plate unit, a carriage assembly slidable along said unit, said carriage assembly including a rotatable impression roller adapted to exert a bearing force against said bed plate, cable means having its extremities fixed relative to the plane of movement of said carriage assembly and having driving relationship with said impression roller, said relationship being such that said cable positively rotates said impression roller at a higher peripheral speed than the peripheral speed communicated to said roller through its bearing traction when said impression roller is in bearing relationship with the sheet being operated upon.

31. In combination, in a hectograph machine, a bed plate unit, a carriage assembly slidable along said unit, means for guiding said carriage assembly, said assembly including an impression roller movable toward and away from said bed plate unit, a cable having its ends fixed relative to said guiding means and having a loop intermediate of its ends, a pulley having driving relationship with said impression roller, said loop being disposed upon said pulley, and means for maintaining the portions of said cable forwardly and rearwardly of said assembly always in line with said ends.

32. In a hectograph machine, in combination, a bed plate unit, a carriage movable along said bed plate unit, guiding means for said carriage, said carriage including an impression roller movable toward and away from said bed plate unit, said impression roller having a pulley co-axial with said impression roller, a cable having its ends fixed relative to said guide means and having a loop intermediate of its ends encircling said pulley, and means for maintaining the portions of said cable forwardly and rearwardly of said assembly always in line with said ends.

33. In a hectograph machine, in combination, a bed plate unit, a carriage assembly slidable along said unit, said carriage assembly including an impression roller movable toward and away from said bed plate, guide means for said carriage assembly, a cable having its extremities fixed relative to said guide means, a pulley co-axially disposed with reference to said impression roller and secured to said impression roller, idler pulleys carried by said carriage assembly, said idler pulleys being disposed in position to maintain the portions of said cable forwardly and rearwardly of said carriage assembly always in line with said extremities.

34. In a hectograph machine, in combination, a bed plate unit, a carriage assembly movable along said unit, guide means for said assembly, an impression roller movably supported by said carriage assembly whereby said impression roller may be moved toward and away from said bed plate, a pulley fixed to said impression roller and co-axial therewith, and idler pulleys carried by said assembly, said idler pulleys being disposed in position to maintain the portions of said cable forwardly and rearwardly of said carriage assembly always in the same straight line regardless of movement of said impression roller.

35. In a hectograph machine, in combination, a bed plate unit, guide rods swingingly carried by said bed plate unit, a carriage assembly slidably disposed upon said rods, said assembly including an impression roller movable relative to the plane of the axes of said rods, a cable for driving said impression roller, said cable having its extremities fixed relative to said rods, and pulleys for receiving said cable and for communicating driving movement from said cable to said impression roller, which pulleys are positioned to maintain the portions of said cable fore and aft of said carriage assembly always in the same straight line relative to the plane of the axes of said rods.

36. In a hectograph machine, in combination, a bed plate unit, a carriage assembly slidable along said unit, said carriage assembly including an impression roller, rocking means carrying said impression roller for movement toward and away from said bed plate, guide means for said carriage assembly, a cable having its extremities fixed relative to said guide means, a pulley co-axially disposed with reference to said impression roller and secured to said impression roller, idler pulleys carried by said carriage assembly, certain of said idler pulleys being co-axially disposed relative to the axis of said rocking means, said idler pulleys being disposed in position to maintain the portions of said cable forwardly and rearwardly of said carriage assembly in line with said extremities.

37. In a hectograph machine, in combination, a bed plate unit, a carriage assembly movable along said unit, guide means for said assembly, said carriage assembly including an impression roller, rocking means whereby said impression roller may be moved toward and away from said bed plate, a pulley fixed to said impression roller and co-axial therewith, and idler pulleys carried by said assembly, said idler pulleys being disposed in position to maintain portions of said cable forwardly and rearwardly of said carriage assembly always in the same straight line relative to the path of movement of said carriage assembly.

38. In a hectograph machine, in combination, a bed plate unit, a carriage assembly movable along said unit, guide means for said assembly, said carriage assembly including an impression roller, rocking means whereby said impression roller may be moved toward and away from said bed plate, a pulley fixed to said impression roller and co-axial therewith, and idler pulleys carried by said assembly, said idler pulleys being disposed in position to maintain portions of said cable forwardly and rearwardly of said carriage assembly always in the same straight line relative to the path of movement of said carriage assembly, certain of said idler pulleys being disposed coaxially with the axis of said rocking means.

39. In a hectograph machine, in combination, a bed plate unit, guide rods swingingly carried by said bed plate unit, a carriage assembly slidably disposed upon said rods, said assembly including an impression roller, rocking means carrying said impression roller whereby said impression roller may be rocked to and fro relative to the plane of the axes of said rods, a cable for driving said impression roller, said cable having its extremities fixed relative to said rods, and pulleys for receiving said cable and for communicating driving movement from said cable to said impression roller, which rollers are positioned to maintain the portions of said cable fore and aft of said carriage assembly always in the same straight line relative to the plane of the axes of said rods.

40. In a hectograph machine, in combination, a bed plate unit, guide rods swingingly carried by said bed plate unit, a carriage assembly slidably disposed upon said rods, said assembly including an impression roller, rocking means carrying said impression roller whereby said impression roller may be rocked to and fro relative to the plane of the axes of said rods, a cable for driving said impression roller, said cable having its extremities fixed relative to said rods, and pulleys for receiving said cable and for communicating driving movement from said cable to said impression roller, which rollers are positioned to maintain the portions of said cable fore and aft of said carriage assembly always in the same straight line relative to the plane of the axes of said rods, certain of said pulleys being coaxially disposed relative to the axis of said rocking means.

41. In a hectograph machine, in combination, a pair of side frames composed of sheet material, spindle supporting means carried by said side frames, said spindle supporting means on one side of said machine including four housing plates arranged in pairs, spindle driving means cooperatively associated with said pairs of housing plates, said side frames having perforations for the reception of said spindle supporting means, said housing plates and said perforations having the same outline said housing plates having a wavy contour including symmetrically disposed wings, said wings of said housing plates being aligned in each of said pairs of housing plates, said wings of said housing plates being aligned with the inwardly projecting portions defining the contour of the corresponding apertures in one of said side frames.

42. In a hectograph machine, in combination, a pair of side frames, means for holding same in fixed spaced relationship with one another, spindle supporting means carried by said side frames, said supporting means being aligned in pairs, said frames having perforations symmetrical with said aligned spindle supporting means, said perforations having all the same contour, four housing plates connected to one of said side frames, said housing plates being arranged in pairs and being symmetrically disposed relative to said apertures of their corresponding side frame, said housing plates all having the same contour as said apertures, each of said housing plates including a central portion having regularly spaced wings extending radially therefrom, the wings of each housing plate in each of said pairs being aligned, and being aligned with inwardly projecting complementary portions of the corresponding side frames.

43. In a hectograph machine, in combination, a carriage assembly, an impression roller oscillatably carried by said carriage assembly, a gripping roller oscillatably carried by said carriage assembly, said gripping roller being adapted to have movement relative to said impression roller, said gripping roller being biased into gripping relationship with said impression roller, and interlocking means cooperatively associated with said gripping and impression rollers for holding said gripping roller out of said gripping relationship until said impression roller is in a predetermined position in its movement of oscillation, said interlocking means including interengaging means for locking said impression roller in operative position.

44. In a hectograph machine, in combination, a carriage assembly including an impression roller, means for oscillatably supporting said impression roller, a gripping roller, means for oscillatably carrying said gripping roller, means biasing said gripping roller into gripping relationship with said impression roller, and means cooperatively associated with the supporting means for said impression roller and gripping roller for holding said gripping roller out of gripping relationship with said impression roller, said holding means having an increasing effect in opposition to said biasing means as said impression roller is oscillated to a predetermined position in its range of movement.

45. In a hectograph machine, in combination, a carriage assembly including an impression roller, means for rockingly carrying said impression roller, a gripping roller, means for oscillatably carrying said gripping roller, spring means for biasing said gripping roller into gripping relationship with said impression roller, said supporting means for said impression roller having portions abutting said supporting means for said gripping roller, the abutting surfaces between said supporting means having a progressively increasing radius relative to the axis of rocking of said impression roller as said impression roller is moved from one limit of its movement of oscillation to the other limit thereof.

46. In a hectograph machine, in combination, a carriage assembly including an impression roller, means for oscillatably supporting said impression roller, a gripping roller, means for oscillatably supporting said gripping roller, a spring for biasing said gripping roller into gripping relationship with said impression roller, said supporting means for said rollers having interengaging camming surfaces whereby the compressing effect upon said spring is varied during the oscillating movement of said impression roller.

47. In a hectograph machine, in combination, a bed plate, a movable carriage assembly, said carriage assembly including an oscillatably supported impression roller, an oscillatably supported gripping roller, said gripping roller being biased into gripping relationship with said impression roller, said impression roller having a range of movement toward and away from said bed plate unit, means cooperatively associated with said gripping roller and said impression roller for locking said impression roller in position adjacent to said bed plate unit.

48. In a hectograph machine, in combination, a bed plate, a movable carriage assembly, said carriage assembly including an oscillatably supported impression roller, an oscillatably supported gripping roller, said gripping roller being biased into gripping relationship with said impression roller, said impression roller having a range of movement toward and away from said bed plate unit, means cooperatively associated with said gripping roller and said impression roller for locking said impression roller in position adjacent to said bed plate unit, and means cooperatively associated with said gripping and impression rollers for holding said gripping roller out of gripping relationship with said impression roller when said impression roller is in position out of adjacency with said bed plate unit.

49. In a hectograph machine, in combination, a bed plate, a carriage assembly movable along said bed plate, means movable relative to said bed plate for supporting said carriage assembly, said carriage assembly including an impression roller, oscillating means for supporting said impression roller, gripping roller, oscillating means for supporting said gripping roller, said supporting means for said impression roller having means for holding said gripping roller out of contact with said impression roller until said impression roller is at an extremity of its travel adjacent to said bed plate, said supporting means for said gripping roller and said supporting means for said impression roller having interengaging portions for locking said impression roller in operative position relative to said bed plate.

50. In a hectograph machine, in combination, a carriage assembly, said assembly including an impression roller, means for oscillatably supporting said impression roller, a gripping roller, means for oscillatably supporting said gripping roller, said supporting means including interengaging means for holding their respective rollers in parallel relationship with each other parallel with the plane of movement of said carriage assembly, regardless of non-uniformity of the thickness of the paper being operated upon in said hectograph machine and for locking said impression roller in operative position.

51. In a hectograph machine, in combination, a bed plate, a movable carriage assembly, means movable relative to said bed plate for guiding said carriage assembly, said guiding means including a pair of parallel tracks, said carriage assembly including an oscillatable impression roller and oscillatable gripping roller adapted to have gripping relationship with said impression roller, and means cooperatively associated with each of said rollers for maintaining the axes thereof parallel with each other.

52. In a hectograph machine, in combination, a carriage assembly including an impression roller and a gripping roller, said gripping roller being adapted to have gripping relationship with said impression roller, and means for oscillatably supporting said rollers, said supporting means including interengaging means, for maintaining the axes thereof in palallelism at all times during the oscillating movement of said impression roller and for locking said impression roller in operative position.

53. In a hectograph machine, in combination, a carriage assembly including side plates, a rocker pivoted thereto, arms carried by said rocker, an impression roller carried by said arms, hangers carried by said side plates, a gripping roller carried by said hangers, said gripping roller being adapted to have gripping relationship with said impression roller, said hangers having a common axis of rotation fixed relative to said side plates, said rocker having a fixed axis of rotation relative to said side plates, said gripping roller having a fixed axis of rotation relative to said hangers, said impression roller having a fixed axis of rotation relative to said rocker, said arms and said hangers having interengaging portions, whereby said rollers are maintained in parallelism with one another at all times during the rocking movement of said rocker and for locking said impression roller in operative position.

54. In a hectograph machine, in combination, a movable carriage assembly, a bed plate, guide means for said carriage assembly, said carriage assembly including an impression roller, a gripping roller adapted to have gripping relationship with said impression roller, means for oscillatably supporting said impression roller within said carriage assembly, means for oscillatably supporting said gripping roller within said carriage assembly, spring controlled means for biasing said supporting means for said gripping rollers, and means cooperatively associated with said supporting means for said gripping and impression rollers for locking said impression roller at one extremity of its range of travel relative to said carriage assembly, and means fixed relative to said guide means for controlling said biasing means to release said impression roller.

55. In a hectograph machine, in combination, a movable carriage assembly, a bed plate, guide means for said carriage assembly, an impression roller carried by said carriage assembly, and oscillatable toward and away from said bed plate unit, a gripping roller carried by said carriage assembly and oscillatable toward and away from said impression roller, means cooperatively associated with said rollers for holding said impression roller out of proximity to said impression roller until said impression roller is at the limit of its travel relative to said carriage assembly toward said bed plate unit, and for locking said impression roller at said limit of its travel, and means fixed relative to said guide means for tripping said locking means to release said impression roller.

56. In a hectograph machine, in combination, a movable carriage assembly, a bed plate, guide means for said carriage assembly, an impression roller, a gripping roller, oscillatable supporting means carried by said carriage assembly for supporting said impression roller, oscillatable supporting means carried by said carriage assembly for supporting said gripping roller, spring controlled means for biasing said gripping roller supporting means into cooperative relationship with said impression roller supporting means, said gripping roller supporting means and impression roller supporting means having interfitting parts for holding said gripping roller out of gripping relationship with said impression roller until said impression roller is in a predetermined position, and for locking said impression roller in said predetermined position, and trip means fixed relative to said guide means for controlling said biasing means to move said gripping roller supporting means out of locking relationship with said impression roller supporting means.

57. In a hectograph machine, in combination, a carriage assembly including an impression roller and a gripping roller, both movable relative to said carriage assembly and relative to each other, means cooperatively associated with said rollers for holding said rollers out of gripping relationship with one another until said impression roller is in a predetermined operative position and for locking said impression roller in said predetermined operative position, and obstacle operated means for releasing said locking means.

58. In a hectograph machine, in combination, a bed plate, a carriage assembly movable along said bed plate, a pair of tracks for supporting and guiding said carriage assembly, a rocker having a fixed axis of oscillation relative to said carriage assembly, an impression roller carried by said rocker, hanger means having an axis of rotation fixed relative to said carriage assembly, a gripping roller carried by said hanger means, spring pressed means connected to said hanger means and normally biasing said hanger means in a direction to cause said gripping roller to have gripping relationship with said impression roller, interlocking means cooperatively associated with said rocker and said hanger means for holding said gripping roller out of gripping relationship with said impression roller until said impression roller is in a predetermined operative position and for locking said impression roller in said predetermined locking position, and obstacle operated means for controlling said spring pressed means to interrupt the locking relationship between said hanger means and said rocker.

59. In a hectograph machine, in combination, a movable carriage assembly, a margin bar cooperating with said carriage assembly, means for resiliently mounting said margin bar whereby after said margin bar has located a sheet of paper to be operated upon, said margin bar may be withdrawn from beneath said paper.

60. In a hectograph machine, in combination, a bed plate, a carriage assembly movable back and forth along said bed plate, a margin bar located adjacent to one limit of travel of said carriage assembly, and swinging means for resiliently carrying said margin bar.

61. In a hectograph machine, in combination, a bed plate, a carriage assembly movable back and forth along said bed plate, a spring pressed margin bar, and means upon said margin bar adapted to engage said carriage assembly whereby said carriage assembly may move said margin bar forwardly from its biased position.

62. In a hectograph machine, in combination, a bed plate, a carriage assembly movable back and forth along said bed plate, a margin bar cooperating with said bed plate and said carriage assembly to locate a piece of paper to be operated upon, resilient mounting means for said margin bar, said margin bar and carriage assembly having parts adapted to engage with one another whereby said carriage assembly may move said margin bar forwardly of its biased position.

63. In a hectograph machine, in combination, a bed plate, a carriage assembly movable back and forth along said bed plate, a margin bar cooperating with said carriage assembly and said bed plate to locate a piece of paper to be operated upon, resilient means for carrying said margin bar, said carriage assembly including an oscillatably mounted impression roller, abutment means cooperatively associated with said margin bar and said carriage assembly whereby said carriage assembly may move said resiliently mounted margin bar forwardly from its biased position, and cam means cooperating with said impression roller for moving said carriage assembly rearwardly when said impression roller is moved away from said bed plate.

64. In a hectograph machine adapted for either margin or marginless work, a bed plate, a carriage assembly movable back and forth along said bed plate, a resiliently mounted margin bar cooperating with said carriage assembly and said bed plate, movable abutment means carried by said margin bar for engagement with said carriage assembly, said means being adapted to be moved out of operative position, an impression roller carried by said carriage assembly, means for moving said impression roller toward and away from said bed plate, said carriage assembly being adapted to engage said movable abutment means when said abutment means are in operative position to move said margin bar forwardly of its biased position, and cam means cooperating with said impression roller when said margin bar is forwardly of its biased position for positively moving said carriage assembly rearwardly as said impression roller is moved away from said bed plate, said cam means being adapted to be thrown out of cooperative relationship with said impression roller.

65. In a hectograph machine, in combination, a bed plate, a carriage assembly movable back and forth along said bed plate, a margin bar, means for locating said margin bar in a plurality of predetermined positions with reference to the direction of travel of said carriage assembly, and means for resiliently supporting said margin bar.

66. In a hectograph machine, in combination, a bed plate, a carriage assembly movable back and forth along said bed plate, a margin bar, means for locating said margin bar in a plurality of predetermined positions with reference to the direction of travel of said carriage assembly, and means for resiliently supporting said margin bar, said margin bar being provided with movable abutments adapted to be engaged by said carriage assembly whereby said carriage assembly may move said margin bar forwardly when said abutment means are in operative position, an impression roller carried by said carriage assembly, and cam means adapted to be thrown out of operative position for cooperation with said impression roller for positively moving said carriage assembly rearwardly when said carriage assembly is at the forward extremity of its range of travel and said impression roller is moved away from said bed plate.

67. In a hectograph machine, in combination, a bed plate, a margin bar, means for resiliently supporting said margin bar, and means for positively locating said margin bar selectably in a plurality of positions.

68. In a hectograph machine, in combination, a bed plate, a margin bar, a carriage assembly movable back and forth along said bed plate, resilient means yieldably urging said margin bar rearwardly, means for positively locating said margin bar in a plurality of positions relative to the direction of travel of said carriage assembly.

69. In a hectograph machine, in combination, a bed plate, a carriage assembly, a margin bar, resilient means biasing said margin bar in a direction rearwardly of said bed plate, means for releasably locating said margin bar in a plurality of positions in a direction of the travel of said carriage assembly, an impression roller and a gripping roller carried by said carriage assembly, spring controlled means adapted to move said gripping roller into gripping relationship with said impression roller, locking means cooperatively associated with said gripping and impression rollers for locking said impression roller in predetermined position relative to said bed plate and to said gripping roller, obstacle operated tripping means for unlocking said impression roller, and cam means for positively moving said carriage assembly rearwardly of said bed plate when said carriage assembly is at the forward end of its range of travel, and said impression roller is moved away from said bed plate.

70. In a hectograph machine adapted for marginless work, a bed plate, a carriage assembly movable back and forth along said bed plate, a margin bar, means for resiliently carrying said margin bar, abutment means carried by said margin bar and adapted to engage said carriage assembly whereby said carriage assembly may move said margin bar forwardly of said machine, an impression roller carried by said carriage assembly, cam means fixed relative to said bed plate for positively moving said carriage assembly rearwardly when said carriage assembly is at the forward end of its travel and said impression roller is moved away from said bed plate, and movable stop means cooperatively associated with said cam means for positively stopping said carriage assembly in a predetermined position intermediate of its range of movement.

71. In a hectograph machine adapted for marginless work, a bed plate, a carriage assembly movable back and forth along said bed plate, a margin bar, means for resiliently carrying said margin bar, abutment means carried by said margin bar and adapted to engage said carriage assembly whereby said carriage assembly may move said margin bar forwardly of said machine, an impression roller carried by said carriage assembly, cam means fixed relative to said bed plate for positively moving said carriage assembly rearwardly when said carriage assembly is at the forward end of its travel and said impression roller is moved away from said bed plate, and movable stop means cooperatively associated with said cam means for positively stopping said carriage assembly in a predetermined position intermediate of its range of movement, said stop means being located out of abutting relationship with said carriage assembly when said impression roller is in proximity to said bed plate and being biased to have abutting relationship with said carriage assembly when said impression roller is in spaced relationship with said bed plate.

72. In a hectograph machine, in combination, a bed plate, a margin bar assembly movable back and forth along said bed plate, said margin bar assembly including spring pressed parts for locating the forward edge of a piece of paper, said carriage assembly and margin bar assembly having cooperating abutting portions whereby said carriage assembly when it moves forwardly of a predetermined position will resiliently react upon said margin bar assembly to move said spring pressed parts forwardly of said bed plate, said carriage assembly including an impression roller, means responsive to movement of said impression roller when said carriage assembly is at the forward limit of its travel for positively moving said carriage assembly rearwardly to said predetermined position, and stop means located out of abutting relationship with said carriage assembly when said impression roller is adjacent to said bed plate but adapted to limit movement of said carriage assembly forwardly of said bed plate to said predetermined position when said impression roller is in spaced relationship with said bed plate.

73. In a hectograph machine, in combination, a bed plate, a carriage assembly, a margin bar, means for locating said margin bar in a plurality of positions in the direction of movement of said carriage assembly, means for yieldingly carrying said margin bar, abutment means cooperatively associated with said carriage assembly and said margin bar whereby said carriage assembly may move said margin bar forward, said abutment means being adapted to be thrown out of operative position, said carriage assembly including an impression roller, means for locking said impression roller in operative position adjacent to said bed plate, and obstacle operated trip means for releasing said impression roller when said carriage assembly is in a predetermined position.

74. In a hectograph machine, in combination, a bed plate, a carriage assembly, a margin bar, means for locating said margin bar in a plurality of positions in the direction of movement of said carriage assembly, means for yieldingly carrying said margin bar, abutment means cooperatively associated with said carriage assembly and said margin bar whereby said carriage assembly may move said margin bar forward, said abutment means being adapted to be thrown out of operative position, said carriage assembly including an impression roller, means for locking said impression roller in operative position adjacent to said bed plate, obstacle operated trip means for releasing said impression roller when said carriage assembly is in a predetermined position, and cam means adapted to cooperate with said carriage assembly for positively moving said carriage assembly rearwardly when said carriage assembly is adjacent to said predetermined position and said impression roller is being raised out of proximity to said bed plate.

75. In a hectograph machine, in combination, a bed plate, a carriage assembly, a margin bar, means for locating said margin bar in a plurality of positions in the direction of movement of said carriage assembly, means for yieldingly carrying said margin bar, abutment means cooperatively associated with said carriage assembly and said margin bar whereby said carriage assembly may move said margin bar forward, said abutment means being adapted to be thrown out of operative position, said carriage assembly including an impression roller, means for locking said impression roller in operative position adjacent to said bed plate, obstacle operated trip means for releasing said impression roller when said carriage assembly is in a predetermined position, cam means adapted to cooperate with said carriage assembly for positively moving said carriage assembly rearwardly when said carriage assembly is adjacent to said predetermined position and said impression roller is being raised out of proximity to said bed plate, and stop means cooperatively associated with said cam means, said stop means having non-abutting relationship with said carriage assembly when said impression roller is in proximity to said bed plate and adapted to have abutting relationship with said carriage assembly when said impression roller is in spaced relationship with said bed plate whereby to hold said carriage assembly under the latter conditions rearwardly of said predetermined position.

76. In a hectograph machine in combination, a margin bar assembly adapted to either marginless or margin work, including a margin bar, means for resiliently carrying said margin bar, and means for positively locating said assembly in a plurality of operative positions.

77. In a hectograph machine, in combination, a bed plate, a carriage assembly, a margin bar assembly adapted for either marginless or margin work, said margin bar assembly including a margin bar and means for resiliently carrying said margin bar, means for positively locating said margin bar assembly in a plurality of positions relative to said bed plate, and movable abutment means cooperating with said margin bar and said carriage assembly, which abutment means are adapted to be brought into engagement to cause the forward movement of said margin bar as said carriage assembly is brought forward to the limit of its movement.

78. In a hectograph machine, in combination, a bed plate, a carriage assembly, a margin bar, said margin bar comprising an elongated member disposed transversely of said bed plate, said margin bar having two intersecting walls in angular relationship with one another defining a corner for receiving the forward edge of paper to be operated upon, one of said surfaces when said margin bar is in operative position relative to said bed plate being disposed in angular relationship with said bed plate slightly less than 180 degrees.

79. In a hectograph machine, in combination, a bed plate, a carriage assembly, a margin bar, said margin bar comprising an elongated member disposed transversely of said bed plate, said margin bar having two intersecting walls in angular relationship with one another defining a corner for receiving the forward edge of paper to be operated upon, one of said surfaces when said margin bar is in operative position relative to said bed plate being disposed in right angular relationship with said bed plate slightly less than 180 degrees.

80. In a hectograph machine, in combination, side frames, means for holding same in fixed relationship with one another, a bed plate unit carried by said side frames, said bed plate unit including side walls spaced inwardly from said side frames, and a side table adjacent to one side of said bed plate unit, said side table having fingers hooking over the upper edge of one of said side frames and disposed between said last mentioned side frame and said bed plate unit.

81. In a hectograph machine, in combination, side frames, means for holding same in fixed relationship with one another, a bed plate unit carried by said side frames, said bed plate unit including side walls spaced inwardly from said side frames, and a side table adjacent to one side of said bed plate unit, said side table having fingers hooking over the upper edge of one of said side frames and disposed between said last mentioned side frame and said bed plate unit, said side table having an abutment portion abutting against the lower portion of the adjacent side frame.

82. A duplicator comprising a platen, a carriage, an impression roll carried by the carriage, and means movable in a direction normal to the platen to slidably journal the carriage for movement over said platen, said movable means adjusting itself to movements of the carriage in directions normal to the platen.

83. A duplicator comprising a horizontal, flat platen, a carriage, an impression roller carried by the carriage, and vertically movable means to slidably journal the carriage for movement over said platen, said movable means adjusting itself to movements of the carriage in a vertical direction.

84. A duplicator comprising a flat platen, a carriage, an impression roller carried by said carriage, and a vertically movable shaft extending longitudinally of said platen and slidably journaling said carriage for movement over said platen, said shaft adjusting itself vertically to compensate for movements of the carriage in a vertical direction.

85. A duplicator comprising a flat platen, a carriage, an impression roller journaled in said carriage, and a shaft mounted for movement in a plane extending at an angle to said platen, said shaft slidably journaling said carriage for movement longitudinally of said platen, said shaft adjusting itself for movements of said carriage in a direction parallel to said plane.

86. A duplicator comprising a flat platen, a carriage, an impression roller journalled in said carriage and a shaft mounted to be freely movable at all times in a plane extending at an angle to said platen, said shaft slidably journalling said carriage for movement longitudinally of said platen.

ULRIK I. T. BLOMBERG.